United States Patent
Matsumoto

(10) Patent No.: US 8,302,501 B2
(45) Date of Patent: Nov. 6, 2012

(54) MULTISTAGE TRANSMISSION

(75) Inventor: Shinya Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 680 days.

(21) Appl. No.: 12/551,391

(22) Filed: Aug. 31, 2009

(65) Prior Publication Data

US 2010/0071492 A1    Mar. 25, 2010

(30) Foreign Application Priority Data

Sep. 25, 2008 (JP) ................ 2008-246752
Sep. 25, 2008 (JP) ................ 2008-246754
Sep. 25, 2008 (JP) ................ 2008-246755

(51) Int. Cl.
F16H 59/00 (2006.01)
F16H 61/00 (2006.01)
F16H 63/00 (2006.01)

(52) U.S. Cl. .................... 74/337.5; 192/93 C
(58) Field of Classification Search ............... 74/325, 74/329, 335, 337.5; 192/93 C
See application file for complete search history.

(56) References Cited

U.S. PATENT DOCUMENTS

| | | | |
|---|---|---|---|
| 1,342,920 A | 6/1920 | Medley | |
| 1,941,161 A * | 12/1933 | Wise | 192/78 |
| 1,943,057 A * | 1/1934 | Bush | 477/77 |
| 2,937,539 A * | 5/1960 | Mueller | 74/372 |
| 3,362,244 A | 1/1968 | Ivanchich | |
| 5,570,608 A * | 11/1996 | Miller | 74/325 |
| 6,409,000 B1 * | 6/2002 | Itoh et al. | 192/39 |
| 6,978,692 B2 * | 12/2005 | Thery | 74/372 |
| 7,484,605 B2 * | 2/2009 | Pawley et al. | 192/43.1 |
| 7,997,159 B2 * | 8/2011 | Hemphill et al. | 74/339 |
| 2008/0098843 A1 | 5/2008 | Hemphill et al. | |
| 2009/0078071 A1 * | 3/2009 | Kubo et al. | 74/333 |
| 2010/0162841 A1 * | 7/2010 | Cavalerie | 74/335 |

FOREIGN PATENT DOCUMENTS

| | | |
|---|---|---|
| DE | 230911 A1 | 12/1985 |
| EP | 0508967 A1 | 10/1992 |
| FR | 2077482 A2 | 10/1971 |
| JP | 45-35687 | 11/1970 |
| WO | WO 94/05931 A2 | 3/1994 |
| WO | WO 00/08357 A1 | 2/2000 |
| WO | WO 2009/122815 A1 | 10/2009 |
| WO | WO 2009/122816 A1 | 10/2009 |

OTHER PUBLICATIONS

Japanese Application No. 2008-093699, Filed Mar. 31, 2008.
Japanese Application No. 2008-093701, Filed Mar. 31, 2008.

* cited by examiner

*Primary Examiner* — Troy Chambers
*Assistant Examiner* — Michael Gonzalez
(74) *Attorney, Agent, or Firm* — Birch, Stewart, Kolasch & Birch, LLP

(57) ABSTRACT

A multistage transmission is provided that smoothly operates with a small force without the necessity of a shift clutch, that does not cause a loss of switching time during shifting, and that does not cause escape of a driving force as well as provides a small shift shock. When shift drive means executes upshift to a one-step-upper speed-change stage reduced in reduction ratio by one stage, normal rotation odd-numbered stage cam rods Cao and normal rotation even-numbered stage cam rods Cae alternately operate normal rotation odd-numbered stage engaging members Rao and the normal rotation odd-numbered stage engaging members Rae for shifting.

15 Claims, 16 Drawing Sheets

NORMAL ROTATION

NORMAL ROTATION

FIG. 10
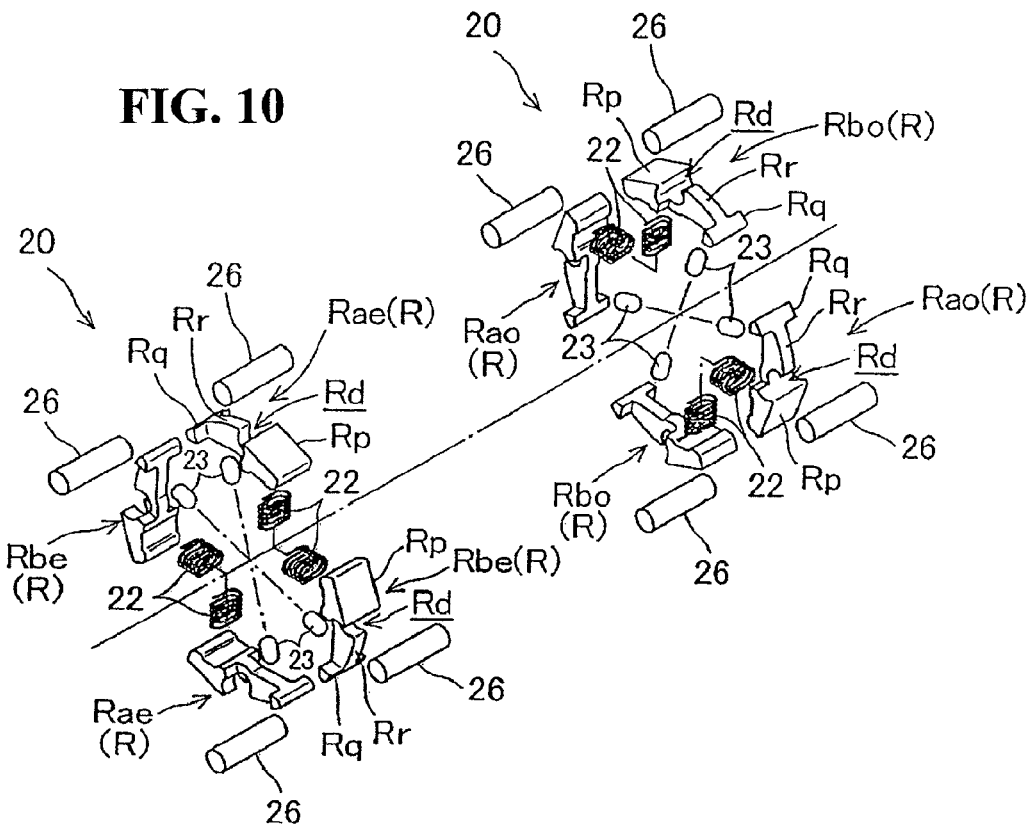
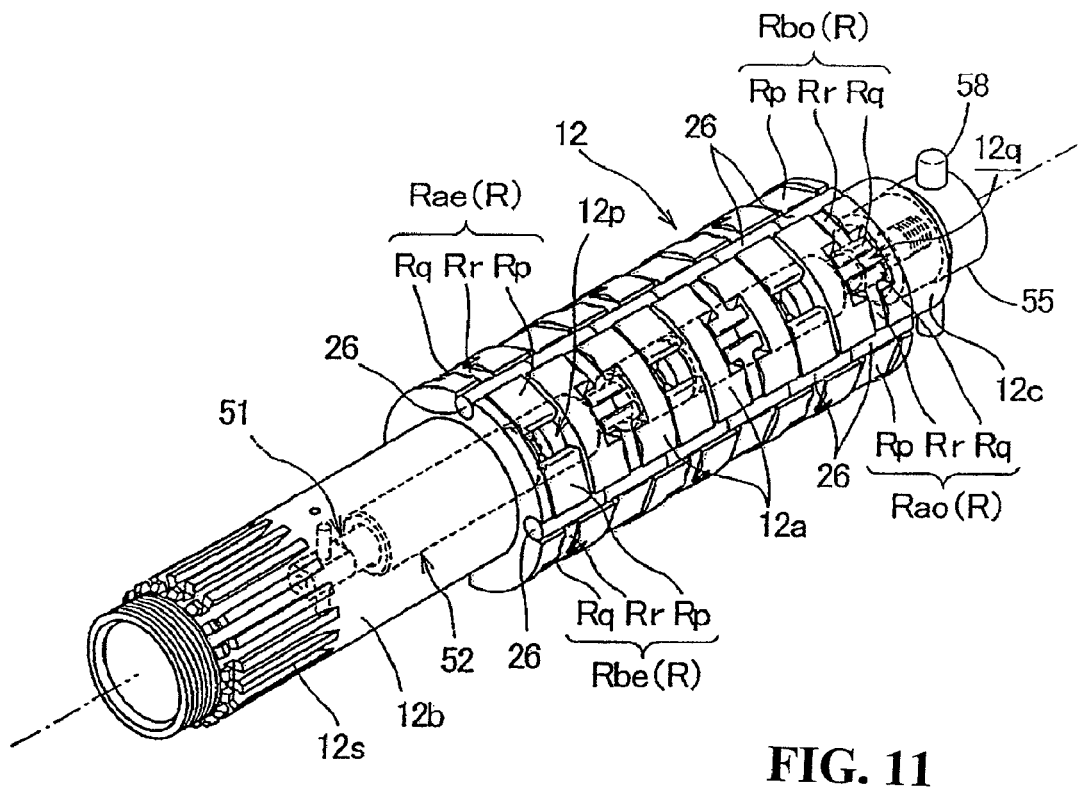
FIG. 11

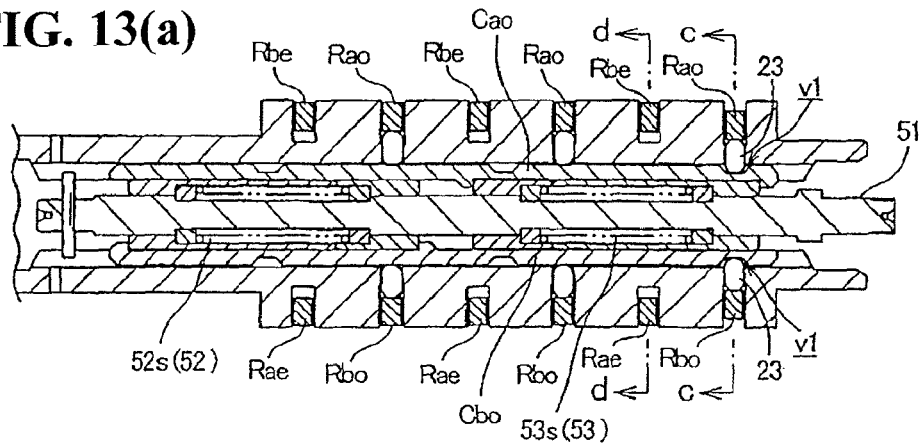
FIG. 13(a)
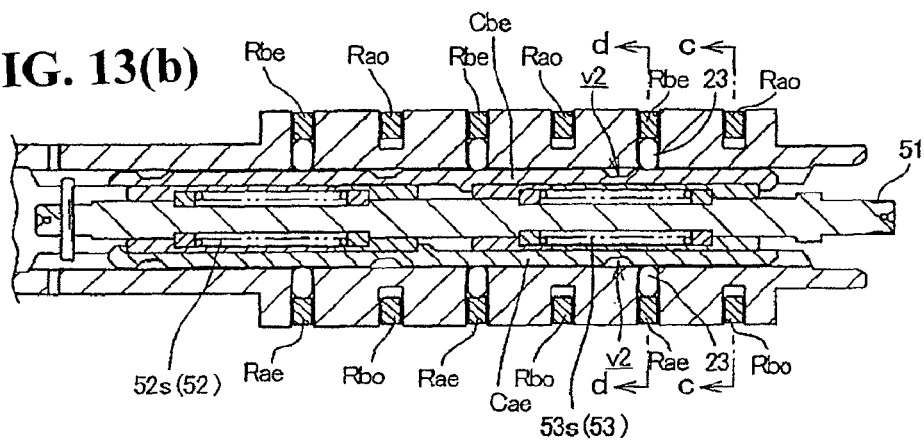
FIG. 13(b)
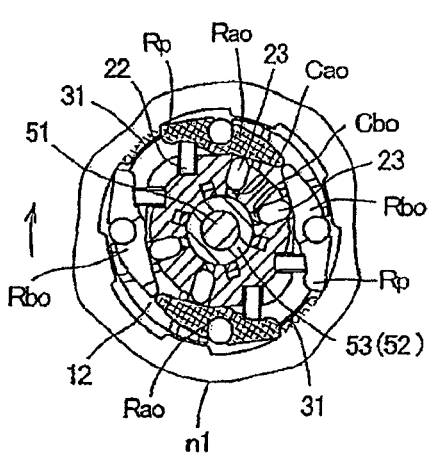 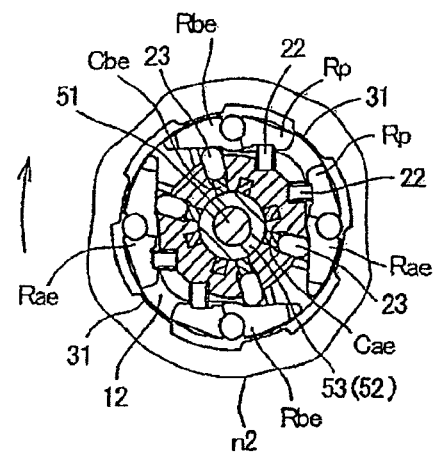
FIG. 13(c)　　　　FIG. 13(d)

FIG. 15(a)
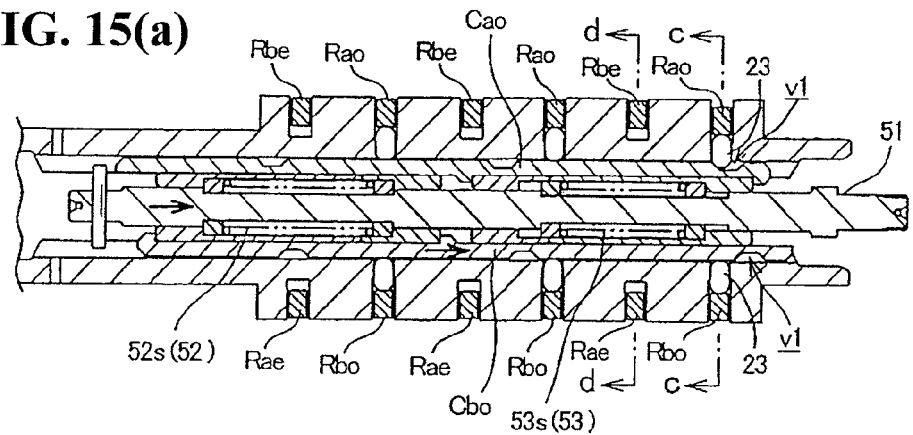
FIG. 15(b)
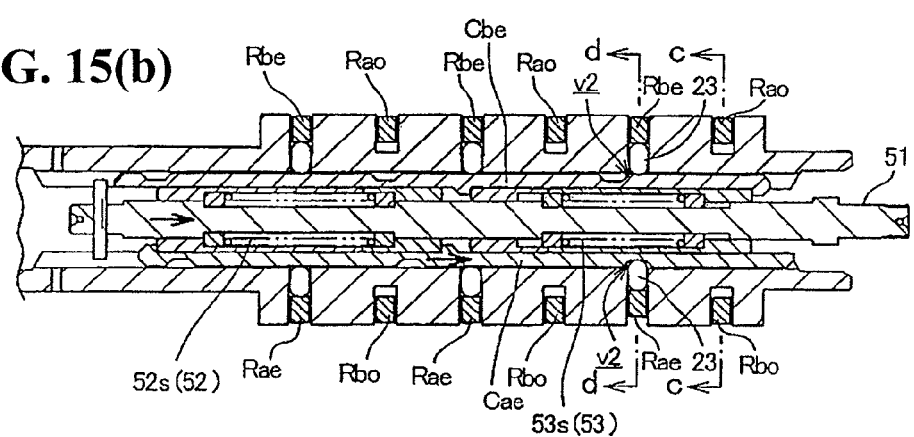
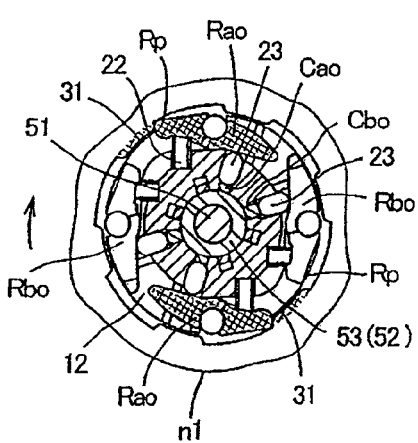
FIG. 15(c)
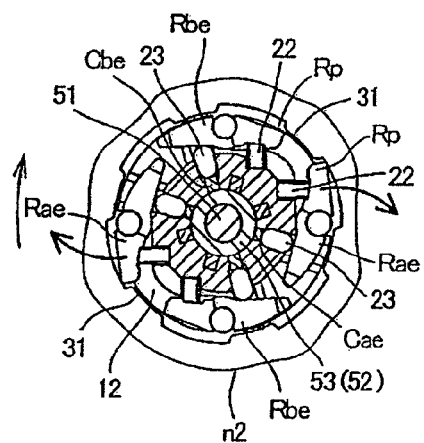
FIG. 15(d)

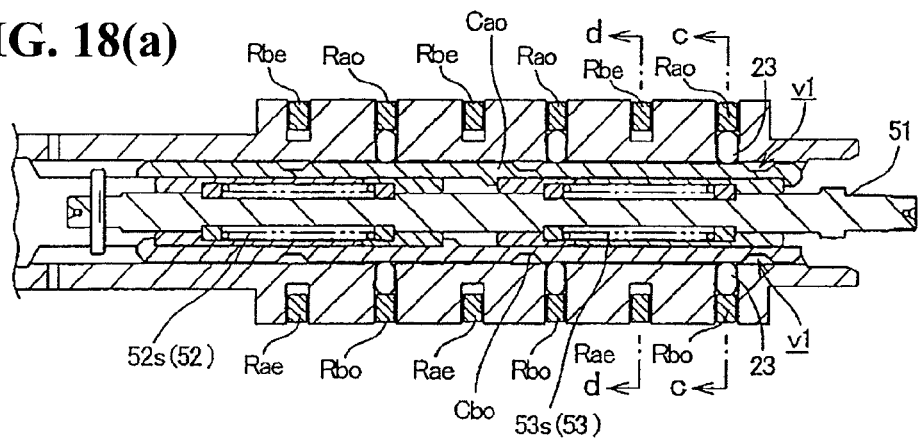
FIG. 18(a)
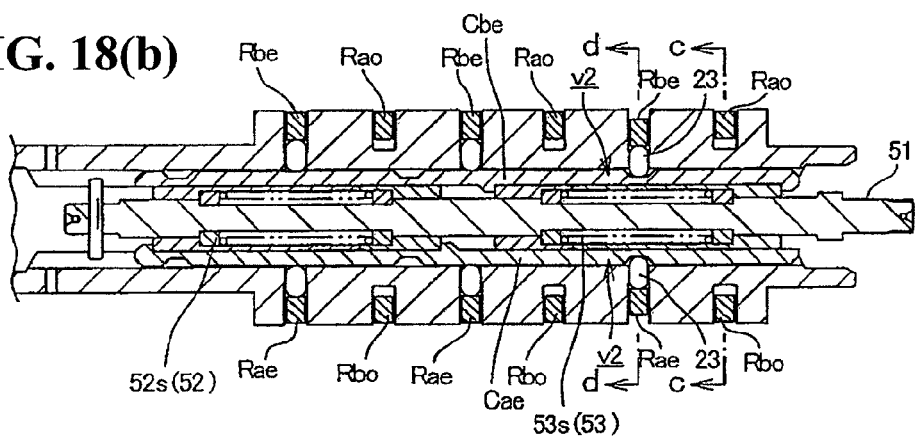
FIG. 18(b)
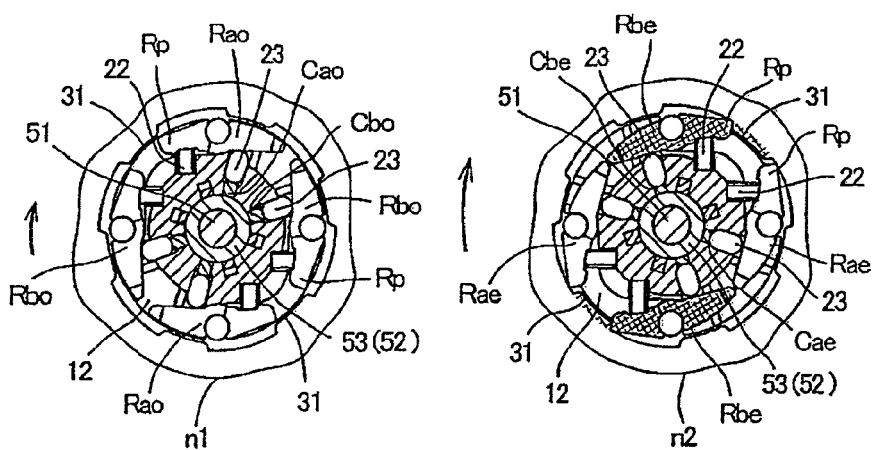
FIG. 18(c)  FIG. 18(d)

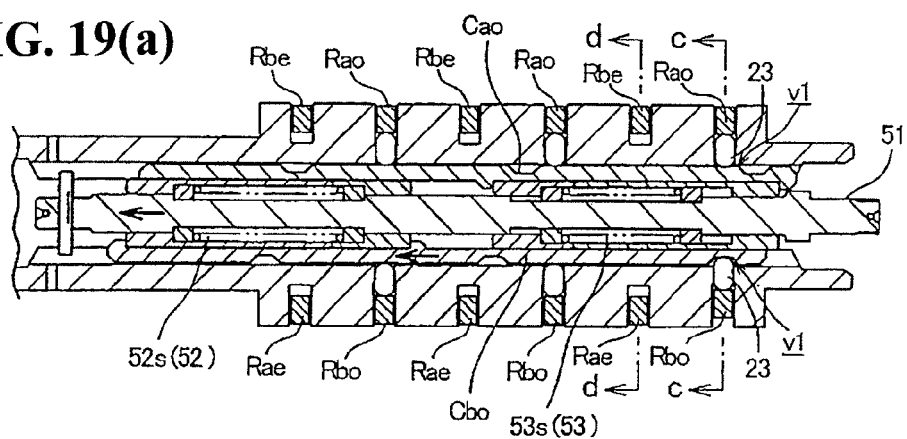
FIG. 19(a)
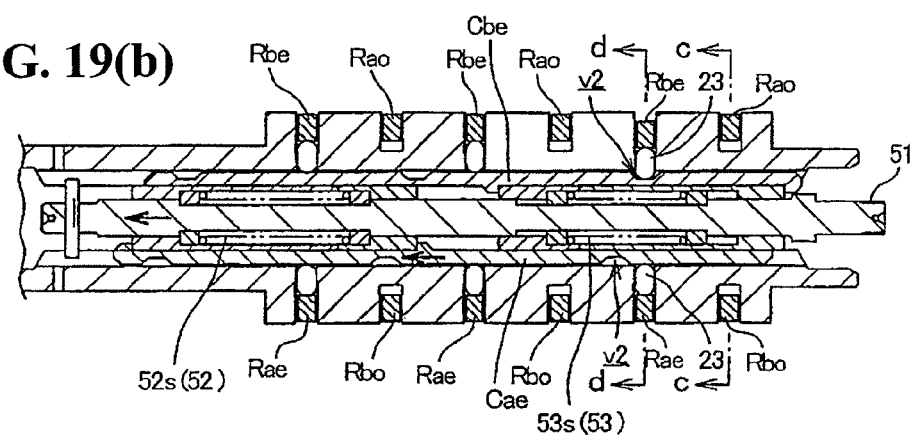
FIG. 19(b)
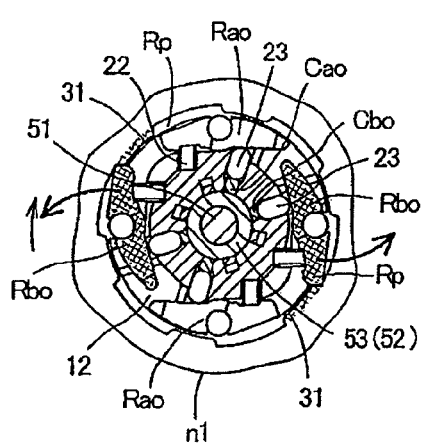
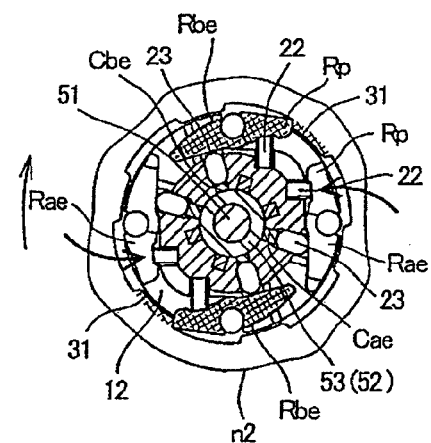
FIG. 19(c)   FIG. 19(d)

FIG. 20(c)   FIG. 20(d)

MULTISTAGE TRANSMISSION

CROSS-REFERENCE TO RELATED APPLICATION

The present application claims priority under 35 U.S.C. §119 to Japanese Patent Application Nos. 2008-246755, 2008-246754, and 2008-246752, each filed Sep. 25, 2008, the entire contents of which are hereby incorporated by reference.

BACKGROUND OF THE INVENTION

1. Field of the Invention

The present invention relates to a multistage transmission in which a plurality of drive gears and driven gears are rotatably supported by respective parallel gear shafts in a constant-mesh state for each speed-change stage.

2. Description of Background Art

A conventional constant-mesh type multistage transmission is such that one of drive gears and driven gears is secured to a gear shaft, the other is rotatably supported by a gear shaft, and a gear engaged with a rotating shaft is switched from the rotatable gears by engaging means for executing shifting.

Engaging means are proposed each of which generally brings a driven gear into engagement with a driven gear shaft, the driven gear being rotatably supported by the driven gear shaft (see e.g. Japanese Patent Publication No. Sho 45-35687).

The engaging means of the constant-mesh type multistage transmission disclosed in Japanese Patent Publication No. Sho 45-35687 is such that a cylinder body formed with axially extending elongated grooves and with widened holes circumferentially widened at the central position of each of the elongated grooves is externally provided on a driven gear shaft so as to be movable in the axial direction and a plurality of driven gears are rotatably supported on the circumference of the cylindrical body.

Rollers installed in incision grooves which are formed at portions of the driven gear shaft corresponding to the driven gears so as to be flatly cut away are loosely fitted in line into the elongated grooves of the cylindrical body except the widened holes.

Among the driven gears rotated through constant-mesh with the drive gears, the driven gears in which the rollers in the elongated groove are in non-contact on the inner circumferential surfaces of the driven gears do not transmit rotation, and only the driven gears in which the rollers in the widened holes are in contact and engagement with the inner circumferential surfaces of the driven gears transmit rotation.

That is to say, since the driven gear located at a position corresponding to the widened hole transmits the rotation to the driven gear shaft, shifting can be executed by axially moving the cylindrical body.

The widened hole adapted to bring the roller into engagement with the driven gear is formed with inclined surfaces at respective inside edges. This makes it easy for the roller to circumferentially move along the inclined surfaces when the cylinder body moves. However, the roller is firmly restrained in place between the incision groove and the inner circumferential surface of the driven gear. Therefore, a significantly large force is needed to release this engagement so that it is not easy to smoothly move the cylindrical body. A shift clutch is needed depending on circumferences.

During shifting, there is a loss of time needed for the switching as described below. The cylindrical body is moved to allow the widened holes to disengage the rollers from driven gear. Then, the widened holes reach the next rollers, which circumferentially move and engage with the adjacent driven gear.

In addition, during shifting, when the engagement of the rollers with the driven gear is released, escape of a driving force occurs and a large shift shock occurs at the time of engaging with the adjacent driven gear. Thus, smooth shifting is difficult.

Another configuration (included in an application previously filed by the present Applicant) is provided herein as another example illustrating the means for engaging the gear with the gear shaft in a conventional constant-mesh type multistage transmission. In this example, cam rods in slidable contact with the hollow inner circumferential surface of the gear shaft are axially slid to operate an engaging member provided in the gear shaft. This operation of the engage member establishes engagement with the gear and releases the engagement therefrom (Japanese Patent Application No. 2008-093699).

The cam rods in slidable contact with the hollow inner circumferential surface of the gear shaft in the multistage transmission disclosed by Japanese Patent Application No. 2008-093699 are generally formed by circumferentially dividing a circular cylinder into four sections. In addition, locking is configured to prevent the relative rotation of each cam rod relative to the gear shaft in such a manner that four projecting ridges formed on the inner circumferential surface of the gear shaft grip the corresponding cam rods from both lateral edges thereof.

The cam rods are elongate members formed by circumferentially dividing the circular cylinder into four sections, i.e., formed like sectors in cross-section. Therefore, they cannot be manufactured with ease. In addition, it is not easy to form the projecting ridges for locking on the hollow inner circumferential surface of the gear shaft.

Still another configuration (included in an application previously filed by the present Applicant) is provided herein as still another example illustrating the means for engaging the gear with the gear shaft in a conventional constant-mesh type multistage transmission. In this example, lost motion mechanisms are assembled into shift drive means which executes shifting by switching and driving engaging means provided between a plurality of gears and a gear shaft to establish engagement therebetween (Japanese Patent Application No. 2008-093701).

The shift drive means of the multistage transmission disclosed in Japanese Patent Application No. 2008-093701 is as below. A control rod disposed at the hollow central axis of the gear shaft is in slidable contact with the insides of two kinds of cam rods in axially movably slidable contact with the hollow inner circumferential surface of the gear shaft. The lost motion mechanisms are disposed at both ends of the cam rods. The lost motion mechanisms are each connected with a corresponding one of the cam rods.

The lost motion mechanism is such that a spring is interposed between the control rod and each cam rod so as to axially act thereon for simultaneous movement. The lost motion mechanisms are compactly housed into the hollow of the gear shaft.

However, since the lost motion mechanisms are arranged at both the ends of the cam rods, the gear shaft is increased in length to increase the axial width of the transmission, which leads to the enlarged transmission.

SUMMARY AND OBJECTS OF THE INVENTION

The present invention has been made in view of such respects and aims to provide a multistage transmission that smoothly operates with a small force to eliminate a shift clutch, that does not cause a loss of switching time during shifting, and that does not cause escape of a driving force as well as provides a small shift shock. The present invention also aims to provide a multistage transmission in which a cam member can be manufactured with ease and locking of the cam member relative to a gear shaft can be configured with ease. Further, the present invention aims to provide a multistage transmission in which lost motion mechanisms of a shift drive mechanism are compactly housed in the hollow of a gear shaft to reduce the size of the multistage transmission per se.

According to an embodiment of the present invention, a multistage transmission includes a plurality of drive gears and driven gears which are rotatably supported by respective parallel gear shafts in a constant-mesh state for each speed-change stage. One of the plurality of drive gears and driven gears is secured to a gear shaft and engaging means provided between the other of the plurality of drive gears and driven gears and the drive shaft to establish engagement therebetween is switchably driven to execute shifting.

In the multistage transmission, the engaging means includes normal rotation odd-numbered engaging members each adapted to bring an odd-numbered stage gear of an odd-numbered speed-change stage into engageable abutment against a gear shaft in a normal rotation direction of the gear to simultaneously rotate the odd-numbered stage gear and the gear shaft; and normal rotation even-numbered engaging members each adapted to bring an even-numbered stage gear of an even-numbered speed-change stage into engageable abutment against the gear shaft in a normal rotation direction of the gear to simultaneously rotate the even-numbered stage gear and the gear shaft. The engaging means also include a normal rotation odd-numbered cam rod adapted to come into axially movably slidable contact with a hollow inner circumferential surface of the gear shaft, formed with a plurality of odd-numbered stage cam grooves on a slidable contact surface at desired axial positions, and operating the normal rotation odd-numbered engaging members; and a normal rotation even-numbered stage cam rod adapted to come into axially movably slidable contact with the hollow inner circumferential surface of the gear shaft, formed with a plurality of even-numbered stage cam grooves on a slidable contact surface at desired axial positions, and operating the normal rotation even-numbered engaging members.

When the shift drive means executes upshift to a one-step-upper speed-change stage reduced in reduction ratio by one stage, the normal rotation odd-numbered stage cam rod and the normal rotation even-numbered stage cam rod alternately operate the normal rotation odd-numbered stage engaging members and the normal rotation even-numbered stage engaging members for shifting.

According to an embodiment of the present invention, the engaging means includes: reverse rotation odd-numbered engaging members each adapted to bring an odd-numbered stage gear of an odd-numbered speed-change stage into engageable abutment against the gear shaft in a reverse rotation direction of the gear to simultaneously rotate the odd-numbered stage gear and the gear shaft; and reverse rotation even-numbered engaging members each adapted to bring an even-numbered stage gear of an even-numbered speed-change stage into engageable abutment against the gear shaft in the reverse rotation direction of the gear to simultaneously rotate the even-numbered stage gear and the gear shaft. Also included are reverse rotation odd-numbered cam rod adapted to come into axially movably slidable contact with a hollow inner circumferential surface of the gear shaft, formed with a plurality of odd-numbered stage cam grooves on a slidable contact surface at desired axial positions, and operating the reverse rotation odd-numbered engaging member; and a reverse rotation even-numbered stage cam rod adapted to come into axially movably slidable contact with the hollow inner circumferential surface of the gear shaft, formed with a plurality of even-numbered stage cam grooves on a slidable contact surface at desired axial positions, and operating the reverse rotation odd-numbered engaging member.

When the shift drive means executes downshift to a one-step-lower speed-change stage increased in reduction ratio by one stage, the reverse rotation odd-numbered stage cam rod and reverse rotation even-numbered stage cam rod alternately operate the reverse rotation even-numbered stage engaging member and the reverse rotation even-numbered stage engaging member for shifting.

According to an embodiment of the present invention, the odd-numbered stage cam grooves of the normal rotation odd-numbered stage cam rod and the even-numbered stage cam grooves of the reverse rotation even-stage cam rod are formed on a single cam rod as a first common cam rod, and the even-numbered stage cam grooves of the normal rotation even-numbered stage cam rod and the odd-numbered stage cam grooves of the reverse rotation odd-stage cam rod are formed on a single cam rod as a second common cam rod.

According to an embodiment of the present invention, the shift drive means includes: a control rod provided, at a hollow central axis of the gear shaft, inside each of the normal rotation odd-numbered stage cam rod, the normal rotation even-numbered stage cam rod, the reverse rotation odd-numbered cam rod, and the reverse rotation even-numbered stage cam rod; and a first lost motion mechanism and a second lost motion mechanism interposed between an outer circumferential surface of the control rod and an inner surface of each of the normal rotation even-numbered stage cam rod, the normal rotation even-numbered stage cam rod, the reverse rotation odd-numbered cam rod and the reverse rotation even-numbered cam rod.

The first lost motion mechanism allows the control rod to simultaneously move the normal rotation odd-numbered stage cam rod and the reverse rotation even-numbered stage cam rod, and the second lost motion mechanism allows the control rod to simultaneously move the normal rotation even-numbered stage cam rod and the reverse rotation odd-numbered stage cam rod.

According to an embodiment of the present invention, the engaging means includes an engaging portion with its engaging surface circumferentially formed at a desired circumferential position of an inner circumferential surface of each gear; an engaging member provided in the gear shaft to engage with the engaging portion of the gear; and a cam member brought into axially movably slidable contact with the hollow inner circumferential surface of the gear shaft, formed with a cam surface on a slidable contact surface and moved to operate the engaging member. In addition, the gear shaft is formed with, on the hollow inner circumferential surface, a cam guide groove extending toward an axial direction to axially guide the cam member, and the cam member is an axially elongated prismatic bar member rectangular in cross-section and is slidably fitted into the cam guide groove.

According to an embodiment of the present invention, the engaging member includes a pin member fitted into a pin hole bored on a radially outside from the desired position of the cam guide groove and advanced and retracted while being in contact with the cam surface of the cam member; and a swing claw member pivotally supported by the gear shaft, and swung by advancement and retraction of the pin member to establish engagement with an engaging surface of the engaging portion and release the engagement. A width of the cam guide groove is smaller than a width of the pin member.

According to an embodiment of the present invention, a control rod internally supporting the cam member is inserted into the hollow of the gear shaft, and a locking pin member radially passing through an end portion of the control rod is slidably engaged with the cam guide groove of the gear shaft.

According to an embodiment of the present invention, the engaging means includes an engaging portion circumferentially formed with engaging surfaces at a plurality of desired circumferential positions of an inner circumferential surface of each gear; an engaging member provided in the gear shaft to disengageably engage with the engaging portion of each gear; and a plurality of cam rods adapted to come into axially movably slidable contact with a hollow inner circumferential surface of the gear shaft, formed with a plurality of cam surfaces on a slidable contact surface at desired axial positions, and be moved to operate the engaging members. The shift drive means includes a control rod provided inside the plurality of cam rods at the hollow central axis of the gear shaft; and a lost motion mechanism interposed between the outer circumferential surface of the control rod and the inner surfaces of the cam rods to simultaneously move the control rod and the cam rods via axially acting springs.

According to an embodiment of the present invention, two of the lost motion mechanisms are axially provided on the control rod, and the lost motion mechanisms simultaneously move the respective different cam rods.

According to an embodiment of the present invention, the lost motion mechanism includes a cylindrical spring holder interposed between the outer circumferential surface of the control rod and the inner surfaces of the cam rods at an axial position covering an outer recessed section formed by reducing the diameter of the control rod, integrally engaged with a desired cam rod, and formed with an inner circumferential recessed section corresponding to the outer circumferential recessed section and having the same axial length as that of the outer circumferential recessed section. The lost motion mechanism also includes a pair of spring receivers, opposed to each other, spanned between both spaces of the inner circumferential recessed section of the spring holder corresponding to the outer circumferential recessed section of the control rod. In addition, the spring is interposed between the pair of spring receivers so as to bias both the spring receivers in such a direction as to make the spring receivers away from each other.

Effects of the invention include the following:

According to the embodiment of the present invention, in the constant-mesh type multistage transmission, when the shift drive means executes upshift to a one-step-upper speed-change stage reduced in reduction ratio by one stage, the normal rotation odd-numbered stage cam rod and the normal rotation even-numbered stage cam rod alternately operate the normal rotation odd-numbered stage engaging members and the normal rotation even-numbered stage engaging members for shifting. Therefore, in the state where the one engage member is engaged with the gear, the other engaging member comes into engagement with the gear of the one-stage-upper speed-change stage for shifting. At this time, due to the rotation speed difference between the associated gears, the engagement of the one-stage-upper gear with the gear shaft by the other engaging member smoothly releases the engagement of the one-stage-lower gear with the gear shaft by the one engaging member. Thus, the multiple transmission smoothly operates without the necessity of force for the disengagement to eliminate a shift clutch. In addition, the multistage transmission does not cause a loss of the switching time during upshift at all and also does not cause escape of a drive force and reduces a shift shock so as to execute smooth upshift.

According to the embodiment of the present invention, when the shift drive means executes downshift to a one-step-lower speed-change stage increased in reduction ratio by one stage, the reverse rotation odd-numbered stage cam rod and the reverse rotation even-numbered stage cam rod alternately operate the reverse rotation odd-numbered stage engaging member and the reverse rotation even-numbered stage engaging member for shifting. Therefore, in the state where the one engaging member is engaged with the gear, the other engaging member comes into engagement with the gear of the one-stage-lower speed-change stage for shifting. At this time, due to the rotation speed difference between the associated gears, the engagement of the one-stage-lower gear with the gear shaft by the other engaging member smoothly releases the engagement of the one-stage-upper gear with the gear shaft by the one engaging member. Thus, the multistage transmission smoothly operates without the necessity of force for the disengagement to eliminate a shift clutch. In addition, the multistage transmission does not cause a loss of the switching time at all during downshift and also does not cause escape of a drive force and reduces a shift shock so as to execute smooth downshift.

According to the embodiment of the present invention, the odd-numbered stage cam grooves of the normal rotation odd-numbered stage cam rod and the even-numbered stage cam grooves of the reverse rotation even-stage cam rod are formed on a single cam rod as a first common cam rod, and the even-numbered stage cam grooves of the normal rotation even-numbered stage cam rod and the odd-numbered stage cam grooves of the reverse rotation odd-stage cam rod are formed on a single cam rod as a second common cam rod. Thus, the kinds of the cam rods can be made two.

According to the embodiment of the present invention, the first lost motion mechanism allows the control rod to simultaneously move the normal rotation odd-numbered stage cam rod and the reverse rotation even-numbered stage cam rod, and the second lost motion mechanism allows the control rod to simultaneously move the normal rotation even-numbered stage cam rod and the reverse rotation odd-numbered stage cam rod. Thus, the two lost motion mechanisms can move the four kinds of the cam rods simultaneously with the single control rod.

According to the embodiment of the present invention, since the cam member is an axially elongated prismatic bar member rectangular in cross-section and is formed with a cam surface on one lateral surface thereof. Thus, the cam member can easily be manufactured from the prismatic bar member that does not have a special shape in cross-section but has a simple rectangular outer shape.

In addition, the gear shaft is formed with, on the hollow inner circumferential surface, the cam guide groove extending toward an axial direction to receive the cam member rectangular in cross-section slidably fitted into the hollow inner circumferential surface for guiding it. Therefore, the cam guide groove serving as a locking member for the cam member relative to the gear shaft is simply rectangular U-shaped in cross-section so that it can simply be formed.

According to the embodiment of the present invention, the width of the cam guide groove is smaller than that of the pin member. Therefore, the pin member advanced and retracted in the pin hole will not fall off into the cam guide groove, which facilitates assembly of the engaging means to the gear shaft.

According to the embodiment of the present invention, the control rod internally supporting the cam member is inserted into the hollow of the gear shaft, and a locking pin member radially passing through the end portion of the control rod is slidably engaged with the cam guide groove of the gear shaft. Therefore, the locking of the control rod relative to the gear shaft can simply be configured using the cam guide groove.

According to the embodiment of the present invention, since the lost motion mechanism is interposed between the outer circumferential surface of the control rod and the inner surfaces of the cam rods, in the hollow of the gear shaft, the control rod, the lost motion mechanisms and the cam rods are configured to radially overlap one another, which can avoid the axial enlargement of the multistage transmission. In addition, the lost motion mechanisms are compactly housed in the hollow of the gear shaft to downsize the multistage transmission per se.

According to the embodiment of the present invention, two of the lost motion mechanisms are axially provided on the control rod, and the lost motion mechanisms each simultaneously move the respective different cam rods. Therefore, the movement of the single control rod allows the plurality of cam rods to execute two kinds of different movements, allowing for smooth shifting. In addition, the lost motion mechanisms are configured symmetrically to curb manufacturing costs and to facilitate parts management during assembly.

According to the embodiment of the present invention, the lost motion mechanisms are each such that the spring is interposed in the space defined between the inner circumferential recessed section of the spring holder interposed between the outer circumferential surface of the control rod and the inner surfaces of the cam rods, and the outer circumferential recessed section of the control rod. Therefore, the lost motion mechanisms having the same shape can be configured on the control rod.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is an exploded perspective view of swing claw members, spindle pins, the pin members and springs;

FIG. 11 is a perspective view illustrating a state where a portion of shift drive means and engaging means are assembled to the control rod;

FIGS. 13(a)-(d) include explanatory views illustrating a first-speed state at the time of starting upshift;

FIGS. 15(a)-(d) include explanatory views illustrating the next process;

FIGS. 16(a)-(d) include explanatory views illustrating the next process;

FIGS. 17(a)-(d) include explanatory views illustrating a second-speed state at the time of completing upshift;

FIGS. 18(a)-(d) include explanatory views illustrating a second-speed state at the time of staring the downshift;

FIGS. 19(a)-(d) include explanatory views illustrating a process during the middle of the downshift operation; and FIGS. 20(a)-(d) include explanatory views illustrating the first-speed state at the time of completing the downshift.

DETAILED DESCRIPTION OF THE PREFERRED EMBODIMENTS

An embodiment of the present invention will hereinafter be described with reference to FIGS. 1 to 20.

A multistage transmission 10 according to the present embodiment is configured to be built into an internal combustion engine mounted on a motorcycle.

Figure 1:
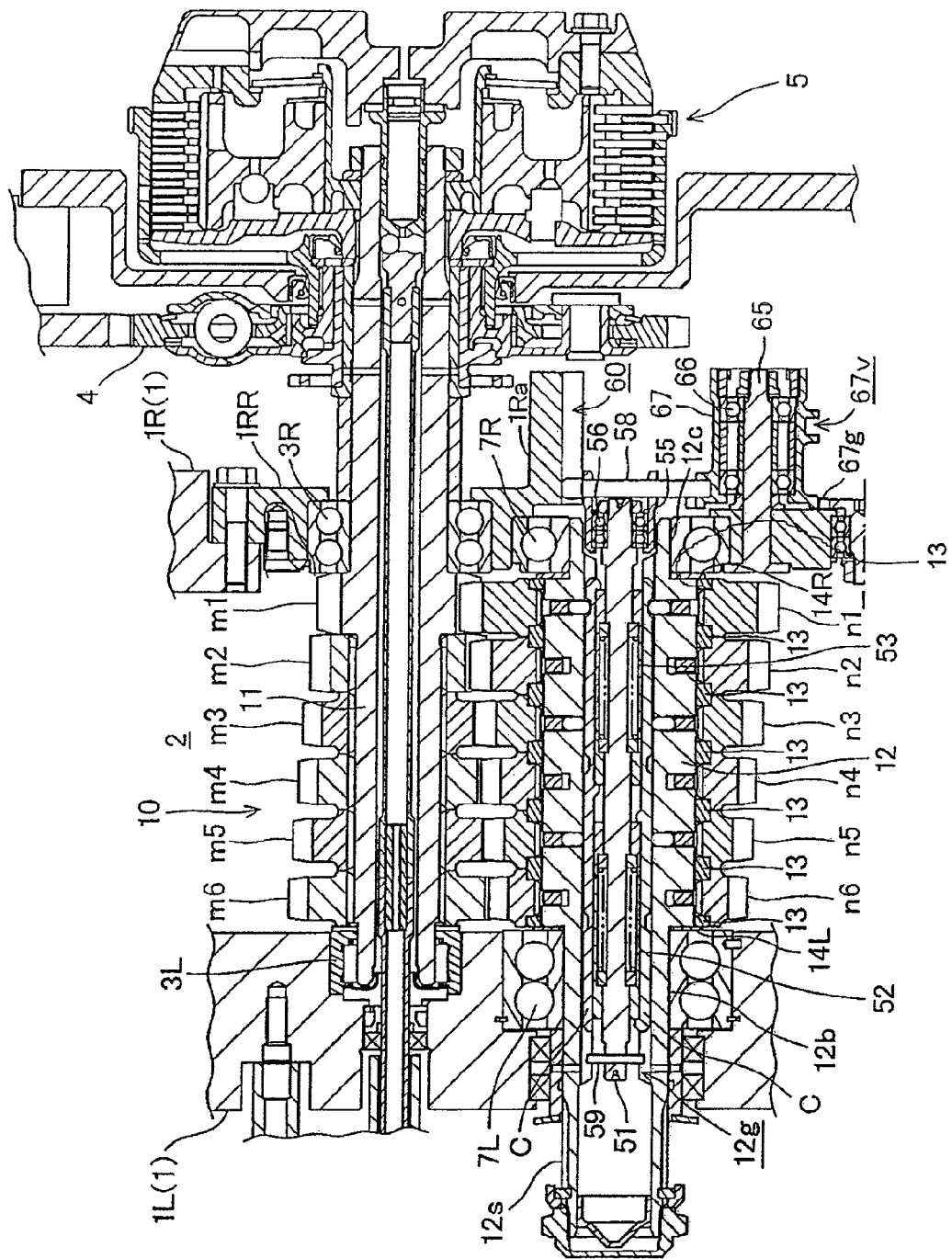
FIG. 1 is a cross-sectional view of a multistage transmission according to an embodiment of the present invention.
Figure 2:
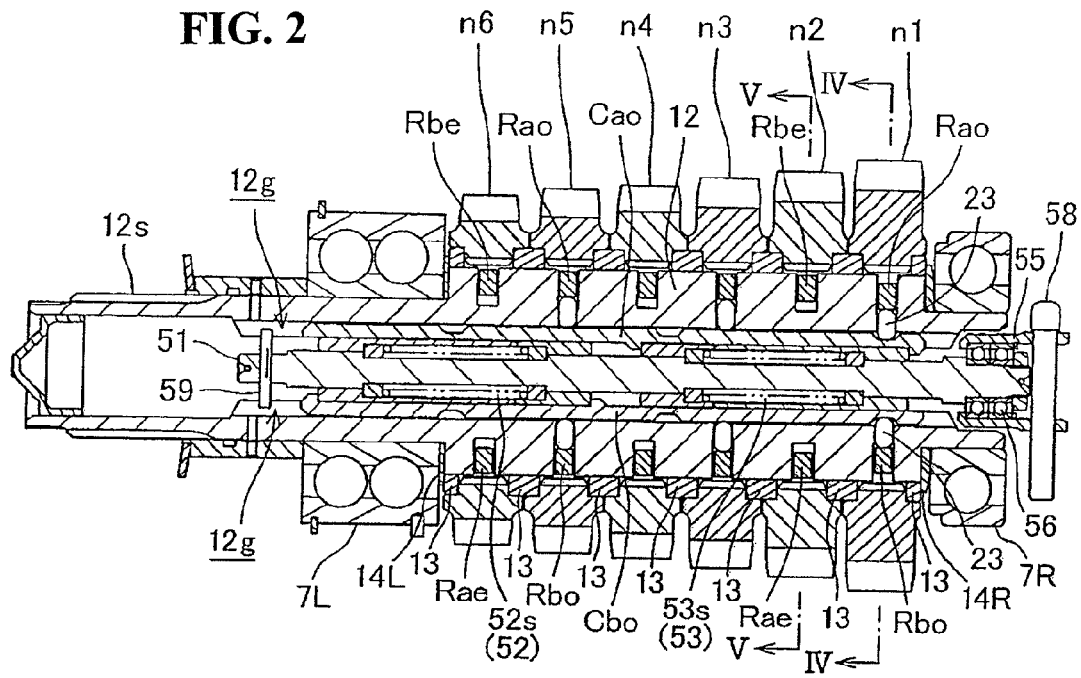
FIG. 2 is a cross-sectional view illustrating a counter gear shaft and its peripheral structure (a cross-sectional view taken along line II-II of FIGS. 4 and 5)
Figure 3:
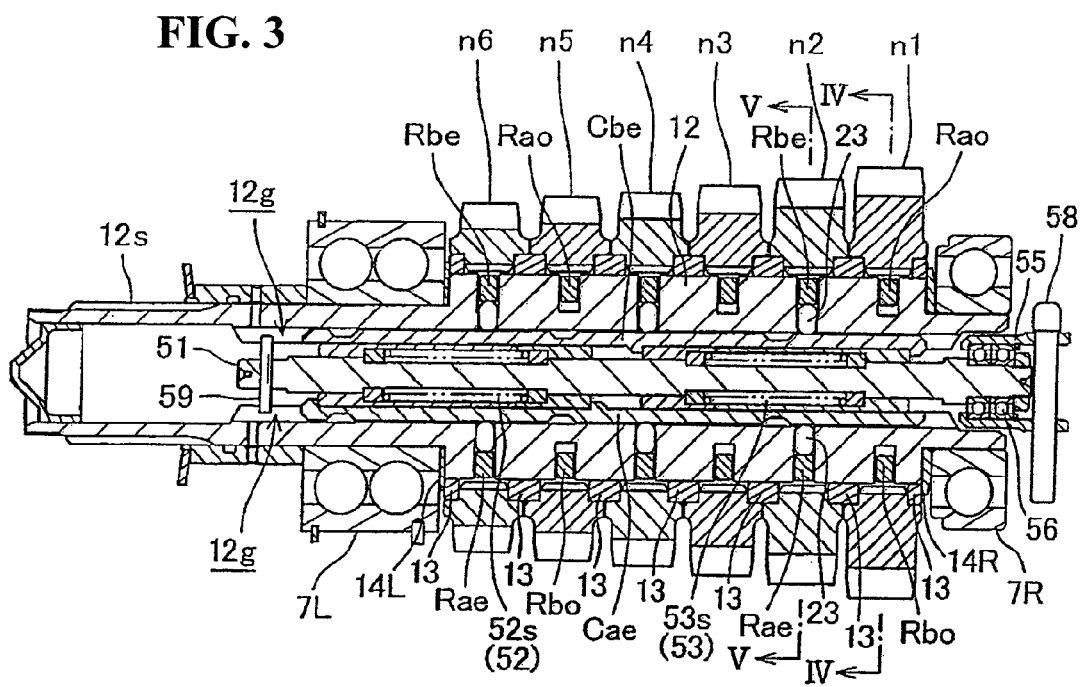
FIG. 3 is another cross-sectional view illustrating the counter gear shaft and its peripheral structure (a cross-sectional view taken along line III-III of FIGS. 4 and 5)

FIG. 1 is a cross-sectional view of the multistate transmission 10. As illustrated in FIG. 1, the multistage transmission 10 is provided in an engine case 1 shared by the internal combustion engine.

This engine case 1 is formed by combining a left engine case 1L and a right engine case 1R which are right-left split from each other. The engine case 1 forms a speed-change chamber 2. A main gear shaft 11 and a counter gear shaft 12 are rotatably supported by the speed-change chamber 2 so as to extend parallel to each other in a right-left direction.

The main gear shaft 11 is rotatably supported by a sidewall of the left engine case 1L and a sidewall 1RR of the right engine case 1R via bearings 3L and 3R, respectively. In addition, the main gear shaft 11 passes through the right bearing 3R and projects from the speed-change chamber 2 to form a right end portion at which a multiple-disk friction clutch 5 is provided.

On the left side of the friction clutch 5 a primary driven gear 4 is rotatably supported by the main gear shaft 11 so as to receive rotation of a crankshaft, not illustrated, transmitted therefrom.

The rotation of the crankshaft of the internal combustion engine is transmitted from the primary driven gear 4 to the main gear shaft 11 via the friction clutch 5 in the engagement state.

On the other hand, also the counter gear shaft 12 is rotatably supported by the sidewall of the left engine case 1L and the sidewall 1RR of the right engine case 1R via bearings 7L and 7R, respectively. In addition, the counter gear shaft 12 passes through the left bearing 7L and projects from the speed-change chamber 2 to form a left end portion thereof to which an output sprocket (not illustrated) is fixedly spline-fitted.

A drive chain wound around the output sprocket is wound around a sprocket driving a rear wheel not illustrated located rearward. In this way, the rotational power of the counter gear shaft 12 is transmitted to the rear wheel to drive the vehicle.

A drive speed-change gear m group is formed between the left and right bearings 3L, 3R on the main gear shaft 11 for rotation integral therewith.

A first drive speed-change gear m1 is formed integral with the main gear shaft 11 along the right bearing 3R. Second, third, fourth, fifth and sixth drive speed-change gears m2, m3, m4, m5 and m6 sequentially increased in diameter in the order from the right to the left are spline-fitted to the spline formed between the first drive speed-change gear m1 of the main gear shaft 11 and the left bearing 3L.

On the other hand, a drive speed-change gear n group is rotatably supported between the left and right bearings 7L, 7R by the counter gear shaft 12 via annular bearing collar members 13.

On the counter gear shaft 12, five bearing collar members 13 are externally provided at regular intervals between a right end bearing collar member 13 and left end bearing collar member 13. The right end bearing collar member 13 is externally provided via the collar member 14R provided on the left of the right bearing 7R. The left end bearing collar member 13 is externally provided via the collar member 14L provided on the right of the left bearing 7L. First, second, third, fourth, fifth and sixth driven speed-change gears n1, n2, n3, n4, n5 and n6 sequentially reduced in diameter in the order from the right to the left are rotatably supported so as to be each straddled between adjacent bearing color members 13, 13 of the totally seven bearing collar members 13.

The first, second, third, fourth, fifth and sixth drive speed-change gears m1, m2, m3, m4, m5 and m6 rotating integrally with the main gear shaft 11 constantly mesh with the first, second, third, fourth, fifth and sixth driven speed-change gears n1, n2, n3, n4, n5 and n6, respectively, rotatably supported by the counter gear shaft 12.

Meshing engagement between the first drive speed-change gear m1 and the first driven speed-change gear n1 establishes a first-speed largest in reduction ratio. Meshing engagement between the sixth drive speed-change gear m6 and the sixth driven speed-change gear n6 establishes a sixth-speed smallest in reduction ratio. The reduction ratios therebetween are sequentially reduced to establish second-, third-, fourth- and fifth-speeds.

Odd-numbered stage gears (the first, third and fifth driven speed-change gears n1, n3 and n5) in which speed-change stages are odd-numbered stages and even-numbered stage gears (the second, fourth and sixth speed-change gears n2, n4 and n6) in which speed-change stages are even-numbered stages are alternately arranged on the counter gear shaft 12.

Engaging means 20 capable of engaging the driven speed-change gears n are built into the counter gear shaft 12 formed like a hollow cylinder as described later. Totally eight cam rods C (Cao, Cao, Cae, Cae, Cbo, Cbo, Cbe, Cbe) which are one constituent element of the engaging means 20 are axially movably fitted into cam guide grooves 12g described later formed in the hollow inner circumferential surface of the counter gear shaft 12. The eight cam rods C contain four kinds of cam rods: two cam rods for each kind.

A control rod 51 which is one constituent element of shift drive means 50 for driving the cam rods C for shifting is inserted into a hollow central axis of the counter gear shaft 12. The axial movement of the control rod 51 axially moves the cam rods C through interlocking with lost motion mechanisms 52 and 53.

A mechanism for axially moving the control rod 51 is provided in the right engine case 1R.

The axial movement of the control rod 51 axially moves the cam rods C via the lost motion mechanisms 52 and 53. The movement of the cam rods C allows the engaging means 20 built into the counter gear shaft 12 to execute selective engagement of each driven speed-change gear n with the counter gear shaft 12 for shifting.

Figure 6:
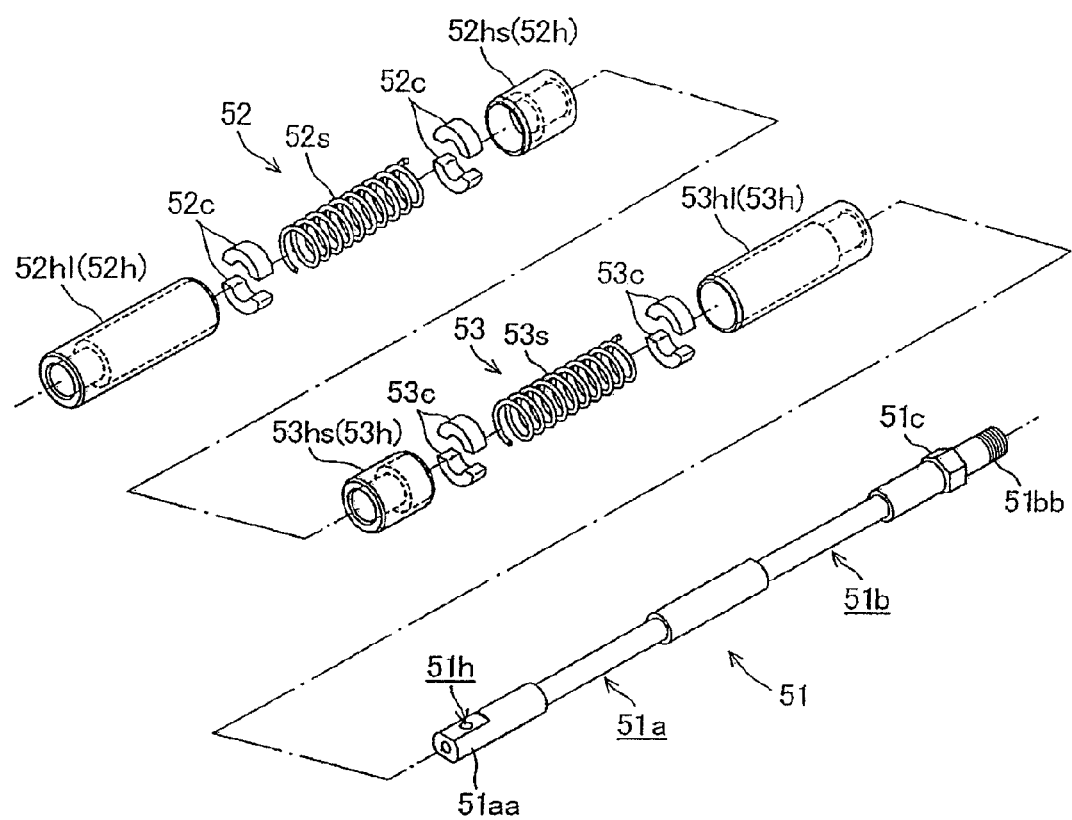
FIG. 6 is an exploded perspective view of a control rod and lost motion mechanisms.

Referring to FIG. 6, the control rod 51 of the shift drive means 50 is formed like a cylindrical rod. In addition, the control rod 51 is formed at two, axially right and left, positions with outer circumferential recessed sections 51a and 51b each reduced in diameter and extending by a given length.

The control rod 51 is formed at a left end with a two-face width-cut end portion 51aa resulting from cutting away circular arc portions by parallel flat surfaces. The two-face width-cut end portion 51aa is bored with a pin hole 51h passing both the flat surfaces.

The control rod 51 is formed at a right end with an external thread end portion 51bb formed with a mail screw. In addition, a hexagonal nut portion 51c is formed in front of the external thread end portion 51bb.

The lost motion mechanisms 52 and 53 are assembled to the left and right outer circumferential recessed sections 51a and 51b, respectively, of the control rod 51.

The left and right lost motion mechanisms 52, 53 have the same configuration and are arranged symmetrically with each other.

The left lost motion mechanism 52 is such that a spring holder 52h is configured by connecting a long holder 52hl with a short holder 52hs so as to receive the control rod 51 slidably fitted thereinto. In addition, the spring holder 52h is formed on an inner circumferential surface with an inner circumferential recessed section 52ha corresponding to the outer circumferential recessed section 51a of the control rod 51.

If the control rod 51 is passed through the spring holder 52h to locate the spring holder 52h at the outer circumferential recessed section 51a, both the spaces of the inner circumferential recessed section 52ha of the spring holder 52h and the outer circumferential recessed section 51a of the control rod 51 form a common space.

A pair of right and left cotters 52c, 52c which are spring receivers are oppositely insertably fitted to straddle both the spaces of the inner circumferential recessed section 52ha of the spring holder 52h and the outer circumferential recessed section 51a of the control rod 51. A compression coil spring 52s wound around the control rod 51 is provided between both the cotters 52c, 52c to bias the cotters 52c, 52c in such a direction as to make them away from each other.

Incidentally, the cotter 52c is formed like a hollow disk having an outer diameter corresponding to the inner diameter of the inner circumferential recessed section 52ha of the spring holder 52h and an inner diameter corresponding to the outer diameter of the outer circumferential section 51a of the control rod 51. In addition, the cotter 52c is half-split for assembly.

Also the right lost motion mechanism 53 (a spring holder 53h, a long holder 53hl, a short holder 53hs, an inner circumferential section 53ha, cotters 53c and a compression coil spring 53s) have the same structure as that of the left lost motion mechanism 52. In addition, the right lost motion mechanism 53 is disposed at the outer circumferential recessed section 51b of the control rod 51.

In this way, the control rod 51 is axially moved to axially move the spring holders 52h and 53h via the compression coil springs 52s and 53s of the left and right lost motion mechanisms 52, 53, respectively.

Figure 7:
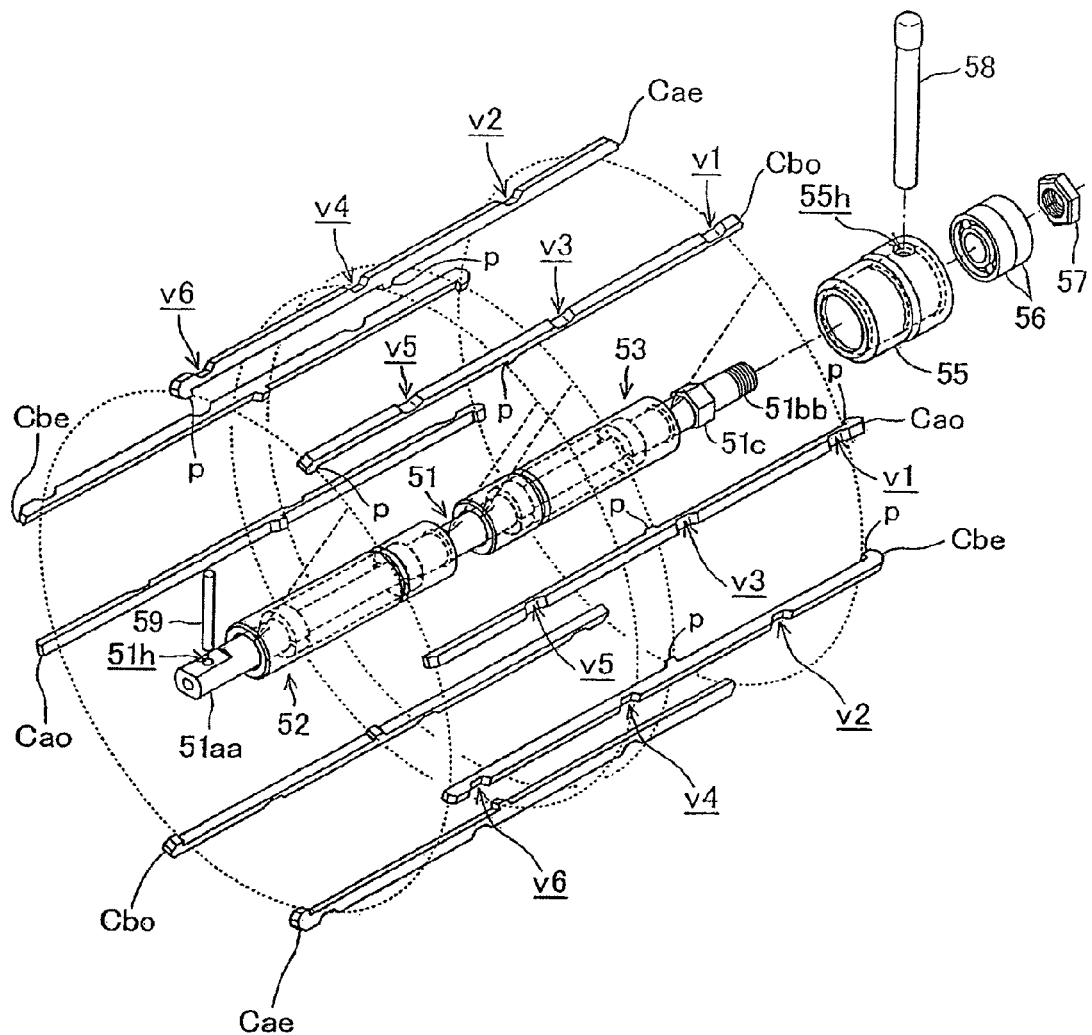
FIG. 7 is an exploded perspective view illustrating a state where the lost motion mechanisms are assembled to the control rod, and the cam rods, etc.

The eight cam rods C (Cao, Cao, Cae, Cae, Cbo, Cbo, Cbe, Cbe) are radially located and abutted against the respective outer circumferential surfaces of the spring holders 52h and 53h of the lost motion mechanisms 52 and 53 attached respectively to the left and right outer circumferential recessed sections 51a, 51b of the control rod 51 (see FIG. 7).

The cam rod C is an axially elongated prismatic bar member rectangular in cross-section. In addition, the cam rod C is formed with a cam face on the outer circumferential lateral surface on the side opposite to the inner circumferential lateral surface in contact with the spring holders 52h and 53h. The cam face is formed with cam grooves v at three desired positions. In addition, a pair of retaining claws p project from the inner circumferential lateral surface so as to retain any one of the spring holders 52h and 53h in such a manner as to grip it from either side thereof.

The cam rod C is not formed in a special shape in cross-section, that is, the cam rod C is a prismatic bar member with a generally simple rectangle outline; therefore, the cam rod C can be manufactured with ease.

The odd-numbered stage cam rods Cao and Cbo each formed with cam grooves v1, v3 and v5 at three positions corresponding, respectively, to the odd-numbered stage gears (the first, third and fifth driving speed-change gears n1, n3 and n5) are of two types. One of the types is for normal rotation (a rotary direction where force is applied from the driven speed-change gear n to the counter gear shaft 12 during acceleration). The other type is for reverse rotation (a rotary direction where force is applied to the counter gear shaft 12 from the driven speed-change gear n to the counter gear shaft 12 during deceleration). The one normal rotation odd-numbered stage cam rods Cao each have a retaining claw p retaining a right spring holder 53h on the inner circumferential lateral surface. The other reverse rotation odd-numbered stage cam rods Cbo each have a retaining claw p retaining the left spring holder 52h on the inner circumferential lateral surface (see FIG. 7).

Similarly, the even-numbered stage cam rods Cae, Cbe each formed with cam grooves v2, v4 and v6 at three positions corresponding, respectively, to the even-numbered stage gears (the second, fourth and sixth driving speed-change gears n2, n4 and n6) are of two types. One of the types is for normal rotation and the other type is for reverse rotation. The one normal rotation even-numbered stage cam rods Cae each have a retaining claw p retaining a left spring holder 52h on the inner circumferential lateral surface. The other reverse rotation even-numbered stage cam rods Cbe each have a retaining claw p retaining the right spring holder 53h on the inner circumferential lateral surface (see FIG. 7).

In this way, the axial movement of the control rod 51 axially simultaneously moves the normal rotation odd-numbered stage cam rods Cao and the reverse rotation even-numbered stage cam rods Cbe along with the spring holder 53h via the compression coil spring 53s of the right lost motion mechanism 53. In addition, the axial movement of the control rod 51 axially simultaneously moves the reverse rotation odd-numbered stage cam rods Cbo and the normal rotation even-numbered stage cam rods Cae along with the spring holder 52h via the coil spring 52s of the left lost motion mechanism 52.

As illustrated in FIG. 7, a cylindrical control rod operating element 55 is attached to an right end portion on the right side of the nut portion 51c of the control rod 51 via a ball bearing 56 fitted into the inside of the operating element 55.

The ball bearing 56 is formed by axially joining together two pieces. The ball bearing 56 is fitted into a right end portion on the right side of the nut portion 51c of the control rod 51, put between the nut portion 51c and a nut 57 threadedly engaged with the external thread portion 51bb and fastened by the nut 57.

In this way, the control rod operating element 55 turnably holds the right end portion of the control rod 51.

A diametrically bored pin hole 55h is formed in a cylindrical portion of the control rod operating element 55 extending rightward from the threadedly engaged nut 57. A shift pin 58 passes through the pin hole 55h.

Incidentally, an engaging pin 59 passes through a pin hole 51h formed at the left end-located two-face width-cut end portion 51aa of the control rod 51.

As illustrated in FIG. 1, the shift pin 58 passed through the control rod operating element 55 has both ends projecting therefrom.

A guide portion 1Ra projects rightward from the sidewall 1RR of the right engine case 1R. The guide portion 1Ra is formed with a groove 60 extending in the left-right direction. A one-end head projecting from the shift pin 58 is slidably fitted to the groove 60 to lock the shift pin 58.

A support shaft 65 is provided on the sidewall 1RR to project rightward therefrom. A shift drum 67 is turnably supported by the support shaft 65 via a bearing 66. The other end projecting portion of the shift pin 58 is slidably fitted to the shift groove 67v of the shift drum 67.

The shift groove 67v of the shift drum 67 is formed on the drum outer circumferential surface so as to draw a spiral along a generally full circle. In addition, the shift groove 67v is formed with the speed-change stage positions from the first through sixth speeds for each given turning angle (e.g. 60 degrees) and with a neutral position in the middle thereof.

In this way, the turning of the shift drum 67 axially moves the shift pin 58 fitted to the shift groove 67v together with the control rod operating element 55.

Since the control rod operating element 55 turnably holds the right end portion of the control rod 51, eventually, the turning of the shift drum 67 axially moves the control rod 51.

This shift drum 67 is turned by manually operating a shift select lever not illustrated via a shift transmitting means (not illustrated).

The shift transmitting means is provided with a mechanism such as a shift cam member adapted to stably hold the shift drum 67 at the speed-change stage positions for each given angle. Thus, the operating force of the shift select lever is transmitted to a gear 67g formed at a lateral edge of the shift drum 67 to sequentially turn the shift drum 67 to the speed-change stage positions.

As described above, the shift drive means 50 is operated as below. The shift drum 67 is turned by the manual operation of the shift select lever. The turning of the shift drum 67 guides and axially moves the shift pin 58 fitted to the shift groove 67v. The movement of the shift pin 58 axially moves the control rod 51 via the control rod operating element 55. The movement of the control rod 51 simultaneously moves the eight cam rods Cao, Cao, Cae, Cae, Cbo, Cbo, Cbe and Cbe of the engaging means 20 via the lost motion mechanisms 52 and 53.

The control rod 51 assembled with the lost motion mechanisms 52 and 53 is inserted into the hollow of the counter gear shaft 12 and arranged at its central axis.

The hollow cylindrical counter gear shaft 12 has an inner diameter generally equal to the outer diameter of each of the respective spring holders 52h and 53h of the lost motion mechanisms 52 and 53. The counter gear shaft 12 is adapted to receive the spring holders 52h and 53h, slidably fitted thereinto, attached to the control rod 51.

The counter gear shaft 12 is formed with eight cam guide grooves 12g on the hollow inner circumferential surface at eight radial positions. The cam guide grooves 12g are each formed rectangle in cross-section so as to extend in the axial direction (see FIG. 9).

The eight cam rods Cao, Cao, Cae, Cae, Cbo, Cbo, Cbe and Cbe are slidably fitted to the corresponding cam guide grooves 12g in the arrangement as illustrated in FIG. 7.

The cam rods C of the same kind are arranged at symmetrical positions.

The cam guide groove 12g serving as a locking member of the cam member C relative to the counter gear shaft 12 is simply formed into in a rectangular U-shape in cross-section; therefore, it can easily be shaped.

The depth of the cam guide groove 12g is equal to the radial direction of the cam rod C. Therefore, a cam face, i.e., an outer circumferential lateral surface, of the cam rod C comes into slidable contact with the bottom surface of the cam guide groove 12g. In addition, its inner circumferential lateral surface comes into contact with the outer circumferential surfaces of the spring holders 52h and 53h so as to generally flush with the hollow inner circumferential surface. The retaining claws p projecting from the inner circumferential lateral surface hold any one of the spring holders 52h and 53h from both the sides thereof.

The hollow cylindrical counter gear shaft 12 is formed with a left cylindrical section 12b and a right cylindrical section 12c both reduced in outer diameter on both the sides of, i.e., on the left and right sides, respectively, of a central cylindrical section 12a. The central cylindrical section 12a rotatably supports the driven speed-change gears n via the bearing collar members 13 (see FIG. 8).

The bearing 7L is fitted to the left cylindrical section 12b via the collar member 14L. In addition, a partial spline 12s is formed on the left cylindrical section 12b and adapted to receive the output sprocket (not illustrated) spline-fitted thereto. On the other hand, the bearing 7R is fitted to the right cylindrical section 12c via the collar member 14R (see FIGS. 1, 2 and 3).

The hollow of the counter gear shaft 12 is internally formed with a small-diameter circumferential surface and a large-diameter inner circumferential surface. The small-diameter inner circumferential surface is formed with the cam guide grooves 12g and has an inner diameter equal to the outer diameter of the spring holders 52h and 53h. The large-diameter inner circumferential surface is such that the inner diameter on both sides of the small-diameter inner circumferential surface is almost flush with the bottom surface of the cam guide grooves 12g (see FIGS. 2 and 3).

The control rod operating element 55 is generally half inserted into the inside of the right enlarged inner diameter section.

The engaging pin 59 passing through the pin hole 51h formed in the two-face width-cut end portion 51aa on the left end of the control rod 51 is engaged at both ends with the cam guide grooves 12g, 12g located at symmetrical positions for serving as a locking member. Thus, the control rod 51 is restricted from relative rotation and rotated integrally with the counter gear shaft 12 while enabling axial movement relative thereto.

The simple configuration where the cam guide grooves 12g are used to engage the engaging pin 59 can lock the control rod 51 relative to the counter gear shaft 12.

As described above, the control rod 51, the lost motion mechanisms 52 and 53, and the eight cam rods Cao, Cao, Cae, Cae, Cbo, Cbo, Cbe and Cbe are assembled into the hollow of the counter gear shaft 12. All of them are rotated together. If the control rod 51 is axially moved, the reverse rotation odd-numbered stage cam rods Cbo and the normal rotation even-numbered stage cam rods Cae are simultaneously axially moved via the coil spring 52s of the left lost motion mechanism 52. In addition, the normal rotation odd-numbered stage cam rods Cao and the reverse rotation even-numbered stage cam rods Cbe are simultaneously axially moved via the coil spring 53s of the right lost motion mechanism 53.

The lost motion mechanisms 52 and 53 are aligned with each other in the axial direction of the counter gear shaft 12 and interposed between the outer circumferential surface of the control rod 51 and the inner surfaces of the cam rods C. In this way, in the hollow of the counter gear shaft 12, the control rod 51, the lost motion mechanisms 52 and 53, and the cam rods C are configured to radially overlap one another to avoid the axial enlargement of the multistage transmission 10. In addition, the lost motion mechanisms 52 and 53 can compactly be housed in the hollow of the counter gear shaft 12 to downsize the multistage transmission 10 per se.

Two of the lost motion mechanisms 52 and 53 are axially provided on the control rod 51 and simultaneously move the corresponding different cam rods C. Thus, the movement of the single control rod 51 allows the plurality of cam rods C to perform two kinds of respective different motions, thereby enabling smooth shifting. In addition, the lost motion mechanisms 52 and 53 are symmetrically configured to suppress manufacturing cost and facilitate parts management during assembly.

The lost motion mechanism 52 is configured such that the coil spring 52s is disposed in the space defined between the inner circumferential recessed portion 52ha of the spring holder 52h interposed between the outer circumferential surface of the control rod 51 and the inner surfaces of the cam rods C, and the outer circumferential recessed section 51a of the control rod 51. Similarly, the lost motion mechanism 53 is configured such that the coil spring 53s is disposed in the space defined between the inner circumferential recessed portion 53ha of the spring holder 53h interposed between the outer circumferential surface of the control rod 51 and the inner surfaces of the cam rods C, and the outer circumferential recessed section 51b of the control rod 51. Thus, the lost motion mechanisms 52 and 53 having the same shape can be configured on the control rod 51.

Figure 8:
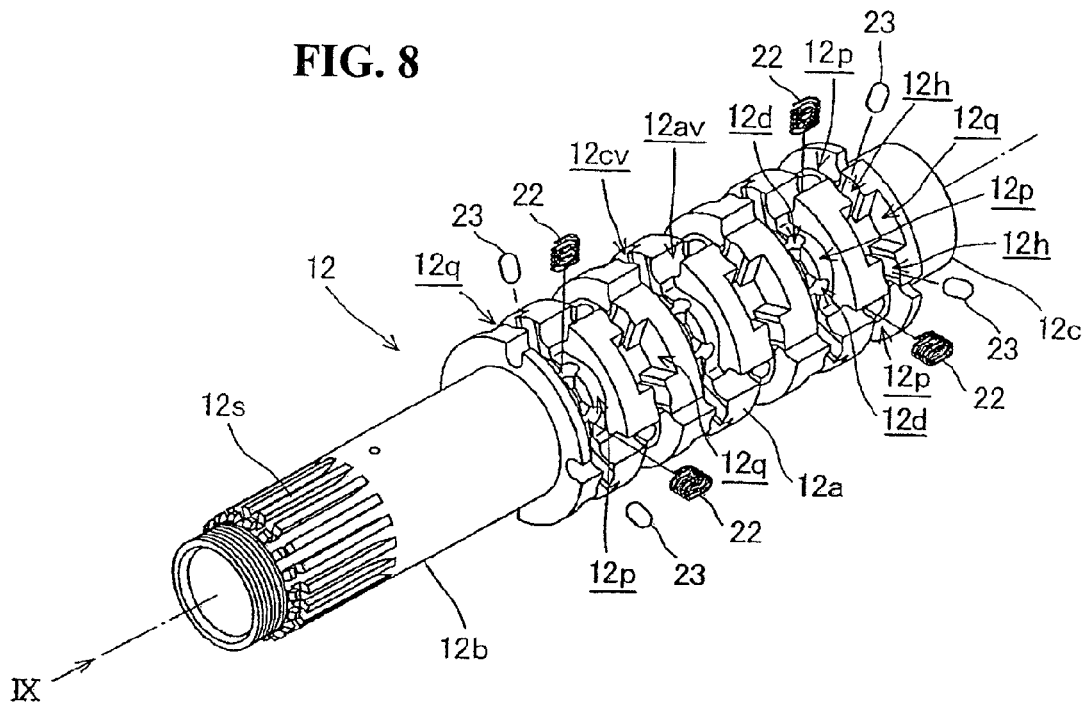
FIG. 8 is a partial exploded perspective view of the counter gear shaft, pin members and springs.
Figure 9:
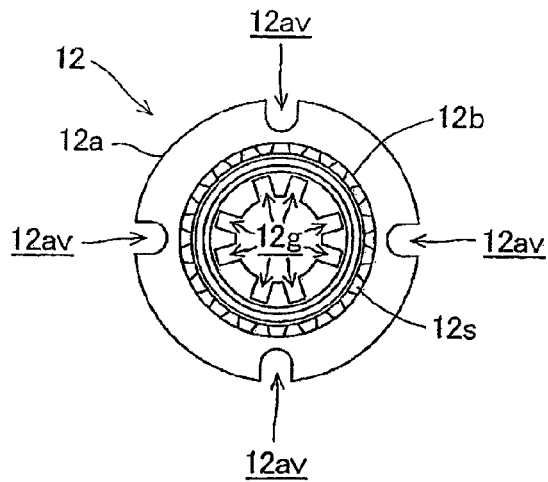
FIG. 9 is a left lateral view (a view as viewed from IX of FIG. 8) of the counter gear shaft.

As illustrated in FIG. 8, the central cylindrical section 12a rotatably supporting the driven speed-change gears n via the bearing collar members 13 of the counter gear shaft 12 is formed to have a large diameter and a large thickness. In the central cylindrical section 12a, six narrow circumferential grooves 12cv circumferentially fully circling this thick outer circumferential portion are formed at axially equal intervals so as to correspond to the first, second, third, fourth, fifth and sixth driven speed-change gears n1, n2, n3, n4, n5 and n6. In addition, four axially extending grooves 12av are circumferentially formed at equal intervals.

Further, the outer circumferential portion of the central cylindrical section 12a of the counter gear shaft 12 is sectioned by the four axial grooves 12av into four sections. Each of the four sections is axially alternately formed with a long rectangular recessed portion 12p and a short rectangular recessed portion 12q. The long rectangular recessed portion 12*p* is such that the groove width of the circumferential groove 12*cv* is right-left-equally enlarged along the distance between the adjacent axial grooves 12*av* in each circumferential groove 12*cv*. The short rectangular recessed portion 12*q* is such that the groove width of the circumferential groove 12*cv* is right-left-equally enlarged along part of the distance between the adjacent axial grooves 12*av* in each circumferential groove 12*cv*.

Slightly recessed spring-receiving portions 12*d*, 12*d* are formed in the bottom of the long rectangular recessed portion 12*p* at two positions spaced circumferentially from each other so as to have an axially long oval figure and extend along the circumferential groove 12*cv*.

Pin holes 12*h* are each bored in a thick-walled portion between the short rectangular recessed portion 12*q* and the axial groove 12*av* and on the circumferential groove 12*cv* so as to finish at the cam guide groove 12*g*.

Specifically, the pin holes 12*h* are bored in the radial direction of the cam guide grooves 12*g* carved at eight circumferential positions from the hollow inner circumferential surface of the counter gear shaft 12.

The pin holes 12*h* are formed on each circumferential groove 12*cv* at four positions.

The elliptically wound compression spring 22 is fitted at its end portion into the spring-receiving portion 12*d*.

A pin member 23 is slidably fitted into the pin hole 12*h*.

Incidentally, the width of the cam guide groove 12*g* communicating with the pin hole 12*h* is smaller than the outer-diametric width of the pin member 23.

Therefore, the advancing and retracting pin member 23 will not fall off into the cam guide groove 12*g*, which facilitates assembly of the engaging means 20 to the counter gear shaft 12.

The cam rod C is slidably fitted to the cam guide groove 12*g*. Therefore, the pin member 23 fitted into the pin hole 12*h* comes into contact with the cam face of a corresponding cam rod C at its central side end portion. If the movement of the cam rod C allows the cam groove v to face the pin hole 12*h*, then the pin member 23 drops into the cam groove v. If movement of the cam rod C allows the cam groove v to be aligned with a slidable contact surface other than the cam groove v, the pin member 23 is allowed to go on the slidable contact surface and to be advanced and retracted by the movement of the cam rod C.

The advancement and retraction of the pin member 23 in the pin hole 12*h* allows its centrifugal side end portion to project and recede from the bottom surface of the circumferential groove 12*cv*.

A swing claw member R is buried in the long rectangular recessed section 12*p*, the short rectangular recessed section 12*q* and the circumferential groove 12*cv* establishing communicative connection between both the recessed sections formed on the outer circumferential portion of the central cylindrical section 12*a* of the counter gear shaft 12 configured as above. Spindle pins 26 are buried in each of the axial grooves 12*av* to pivotally support corresponding swing claw members R.

FIG. 11 illustrates a state where all the swing claw members R are assembled as described above.

An exploded perspective view of FIG. 10 illustrates a one set of four swing claw members R and the other set of four swing claw members R with their postures maintaining relative-angle position relationship therebetween. The one set of four swing claw members R are buried in the circumferential groove 12*cv*, the long rectangular recessed section 12*p* and the short rectangular recessed section 12*q* corresponding to the odd-numbered stage gears (the first, third and fifth driven speed-change gears n1, n3 and n5). The other set of four swing claw members R are buried in the circumferential groove 12*cv*, the long rectangular recessed section 12*p* and the short rectangular recessed section 12*q* corresponding to the even-numbered stage gears (the second, fourth and sixth driven speed-change gears n2, n4 and n6). In addition, this view illustrates the spindle pins 26 supporting the swing claw members R and the compression springs 22 acting on the swing claw members R, and the pin members 23.

All of the swing claw members R used have the same shape, which is formed in a generally circular arc shape as viewed in the axial direction. The swing claw member R is formed with a bearing recessed portion Rd, a wide rectangular engaging claw portion Rp, a narrow pin-receiving portion Rr and a wide end portion Rq. The bearing recessed portion Rd is formed by cutting away an outer circumferential portion of a through hole adapted to receive the spindle pin 26 centrally passed therethrough. The wide rectangular engaging claw portion Rp is formed on one side of the swing center of the bearing recessed portion Rd so as to be swingably fitted into the long rectangular recessed portion 12*p*. The narrow pin-receiving portion Pr extends toward the other side of the swing center of the bearing recessed portion Rd and is swingably fitted into the circumferential groove 12*cv* formed with the pin hole 12*h*. The wide end portion Rq is formed at an end of the narrow pin-receiving portion Rr so as to reach the short rectangular recessed portion 12*q* and extend widthwise.

The swing claw member R is such that the pin-receiving portion Rr is fitted into the circumferential groove 12*cv* formed with the pin holes 12*h*. The engaging claw portion Rp on the one side is fitted into the long rectangular recessed portion 12*p* and the bearing recessed portion Rd is aligned with the axial groove 12*av*. The wide end portion Rq on the other side is fitted into the short rectangular recessed portion 12*q*.

The spindle pin 26 is fitted into the bearing recessed portion Rd and the axial groove 12*av* aligned with each other.

The swing claw member R is formed symmetrical with respect to the circumferential groove 12*cv* to be fitted thereinto. The wide rectangular claw portion Rp on the one side is heavier than the pin-receiving portion Rr and the wide end portion Rq on the other side. If the swing claw member R is pivotally supported by the spindle pin 26 and rotated together with the counter gear shaft 12, the engaging claw portion Rp acts as a weight with respect to the centrifugal force to swing the swing claw member R while allowing it to project in the centrifugal direction.

The swing claw member R is formed such that the pin-receiving portion Rr has a width smaller than that of the engaging claw portion Rp on the side opposite to the side of the pin-receiving portion Rr with respect to the swing center.

Since the pin-receiving portion Rr needs only to have a width enough to receive the pin member 23, the swing claw member R can be formed small and the engaging claw portion Rp on the other side can easily be swung by a centrifugal force.

The swing claw members R circumferentially adjacent to each other are assembled to the counter gear shaft 12 in a symmetrical posture. Therefore, the engaging claw portions Rp, Rp opposed to each other at a given interval are fitted into the common long rectangle recessed portion 12. In addition, the wide end portions Rq close to each other on the other side are fitted to the common short rectangular recessed portion 12*q*.

The compression spring 22 whose one end is supported by the spring-receiving portion 12*d* of the counter gear shaft 12 is provided inside the engaging claw portion Rp of the swing claw member R. The pin member 23 fitted into the pin hole 12h is provided inside the pin-receiving portion Rr and between the pin-receiving portion Rr and the cam rod C.

In this way, the swing claw member R is swingably supported by the spindle pin 26 and buried in the long rectangular recessed portion 12p, short rectangular recessed portion 12q and circumferential groove 12cv of the counter gear shaft 12. The engaging claw portion Rp on the one side is externally biased by the compression spring 22 and the pin-receiving portion Rr on the other side is pressed by the advancement and retraction of the pin member 23. Thus, the swing claw member R is swung against the biasing force of the compression spring 22.

When the pin member 23 advances in the centrifugal direction to swing the swing claw member R, the engaging claw portion Rp of the swing claw member R sinks in the long rectangular recessed portion 12p. That is to say, nothing externally projects from the outer circumferential surface of the central cylindrical portion 12a of the counter gear shaft 12.

When the pin member 23 retracts, the engaging claw portion Rp biased by the compression spring 22 projects outwardly from the outer circumferential surface of the central cylindrical section 12a of the counter gear shaft 12 and is able to engage the driven speed-change gear n.

The compression spring 22 is interposed between the inner surface of the engaging claw portion Rp of the swing claw member R and the long rectangular recessed portion, of the counter gear shaft 12, opposed to the inner surface of the engaging claw portion Rp. This eliminates a spring-specific axial space so that the axial enlargement of the counter gear shaft 12 can be avoided. In addition, the compression spring 22 is disposed at the axially widthwise center of the swing claw member R so that the swing claw member R per se can be formed symmetric with respect to the axial direction. Therefore, two kinds of swing claw members engaged and disengaged in both directions of relative rotational directions of the driven speed-change gear n and the counter gear shaft 12 can be taken as the swing claw members R having the same shape. Thus, it is not necessary to prepare swing claw members different in shape from each other.

The compression spring 22 is formed in an oval figure with a major axis extending in the axial direction of the counter gear shaft 12. This oval-shaped compression spring 22 has the oval axis greater than the width of the pin-receiving portion Rr of the sing claw member R. In addition, the compression spring 22 is received to straddle the circumferential groove 12cv formed to circumferentially extend around one circle and receive the pin-receiving portion Rr swingably fitted thereto. Thus, the machining of the counter gear shaft 12 can be facilitated and the swing claw member R can stably be assembled to the counter gear shaft 12.

The four swing claw member R corresponding to the odd-numbered stage gears (the first, third and fifth driven speed-change gears n1, n3 and n5) and the four swing claw member R corresponding to the even-numbered stage gears (the second, fourth and sixth driven speed-change gears n2, n4 and n6) are in relative-angle positional relationship where they are turned 90 degrees around the axis with each other.

The four swing claw members R corresponding to the odd-numbered stage gears (the first, third and fifth driven speed-change gears n1, n3 and n5) are composed of a pair of normal rotation odd-numbered stage swing claw members Rao arranged at respective symmetrical positions and a pair of reverse rotation odd-numbered stage engaging members Rbo arranged at respective symmetrical positions. The normal rotation odd-numbered stage driven swing claw members Rao are abutted in the normal-rotational direction of gears to establish engagement to synchronously rotate each of the odd-numbered stage driven speed-change gears n1, n3 and n5 and the counter gear shaft 12. The reverse rotation odd-numbered stage engaging members Rbo are abutted in the reverse-rotational direction of gears to establish engagement to synchronously rotate each of the odd-numbered stage driven speed-change gears n 1, n3 and n5 and the counter gear shaft 12.

Similarly, the four swing claw members R corresponding to the even-numbered stage gears (the second, fourth and sixth driven speed-change gears n2, n4 and n6) are composed of a pair of normal rotation even-numbered stage swing claw members Rae arranged at respective symmetrical positions and a pair of reverse rotation even-numbered stage engaging members Rbe arranged at respective symmetrical positions. The normal rotation even-numbered stage driven swing claw members Rae are abutted in the normal-rotational direction of gears to establish engagement to synchronously rotate each of the even-numbered stage driven speed-change gears n2, n4, n6 and the counter gear shaft 12. The reverse rotation even-numbered stage engaging members Rbe are abutted in the reverse-rotational direction of gears to establish engagement to synchronously rotate each of the even-numbered stage driven speed-change gears n2, n4, n6 and the counter gear shaft 12.

The normal rotation odd-numbered stage swing claw member Rao is swung by the pin member 23 advanced and retracted by the movement of the normal rotation odd-numbered stage cam rod Cao. The reverse rotation odd-numbered stage engaging member Rbo is swung by the pin member 23 advanced and retracted by the movement of the reverse rotation odd-numbered stage cam rod Cbo.

Similarly, the normal rotation even-numbered stage swing claw member Rae is swung by the pin member 23 advanced and retracted by the movement of the normal rotation even-numbered stage cam rod Cae. The reverse rotation even-numbered stage engaging member Rbe is swung by the pin member 23 advanced and retracted by the movement of the reverse rotation even-numbered stage cam rod Cbe.

When the engaging means 20 are assembled to the counter gear shaft 12, first, the right end bearing collar member 13 is externally provided on the outer circumferential end portion of the central cylindrical section 12a. While one end of the spindle pin 26 is fitted into the axial groove 12av inside the bearing collar member 13, the right end engaging means 20 is assembled. The next bearing collar member 13 is externally provided to cover the other end of the spindle pin 26. Thereafter, the next stage engaging means 20 is assembled in the same manner as the previous stage. Such assembly is repeated and lastly the left end bearing collar member 13 is externally provided. Thus, the assembly is completed.

Figure 12:
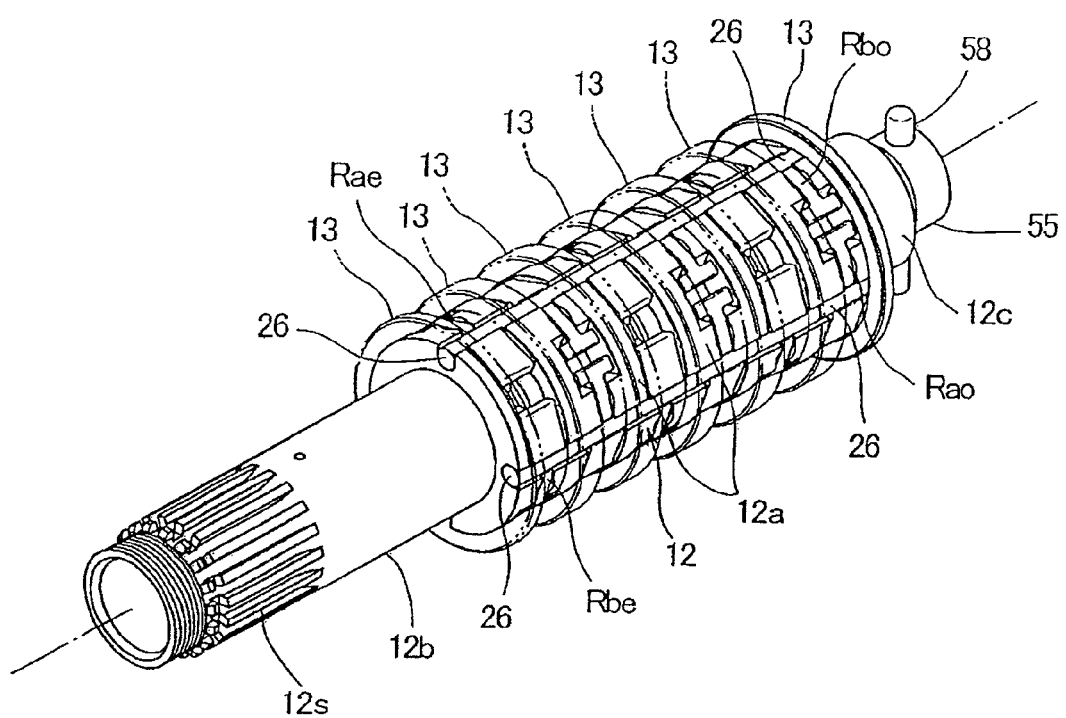
FIG. 12 is a perspective view illustrating a state where a bearing collar member is externally provided on the counter gear shaft of the state illustrated in FIG. 11.

As illustrated in FIG. 12, the bearing collar members 13 are externally provided at the axial positions of the central cylindrical portion 12a other than the long rectangular recessed portion 12p and the short rectangular recessed portion 12q. In addition, the bearing color members 13 are arranged to straddle adjacent spindle pins 26, 26 of the spindle pins 26 buried continuously in line in the corresponding axial grooves 26av. Thus, the spindle pins 26 and the swing claw members R are prevented from falling off.

The spindle pin 26 buried in the axial groove 12av of the central cylindrical section 12a of the counter gear shaft 12 is buried at a depth in contact with the outer circumferential surface of the central cylindrical portion 12a. Therefore, if externally provided, the bearing collar members 13 are secured without loose.

The seven bearing collar members 13 are externally provided on the counter gear shaft 12 at regular intervals and the driven speed-change gears n are rotatably supported so as to each straddle between the adjacent bearing collar members 13, 13.

Each of the driven speed-change gears n is formed with notches at right and left inner circumferential edge portions (the right and left circumferential edge portions of the inner circumferential surface). In addition, an annular thin projecting ridge 30 is formed between the right and left notches. The right and left collar members 13, 13 are slidably engaged with the corresponding notches so as to put the projecting ridge 30 therebetween (see FIGS. 2 and 3).

Engaging projections 31 are formed on the projecting ridge 30 of the inner circumferential surface of each driven speed-change gear n at six positions with circumferentially regular intervals (see FIGS. 2, 3, 4 and 5).

Figure 4:
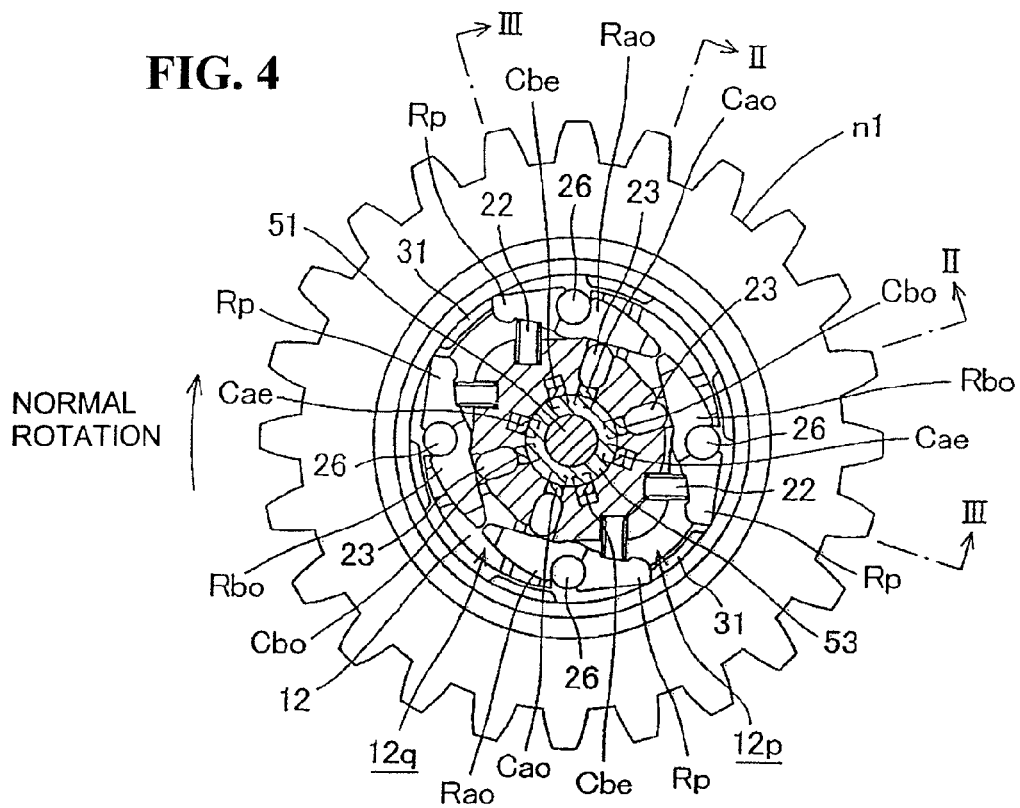
FIG. 4 is a cross-sectional view taken along line IV-IV of FIGS. 2 and 3.
Figure 5:
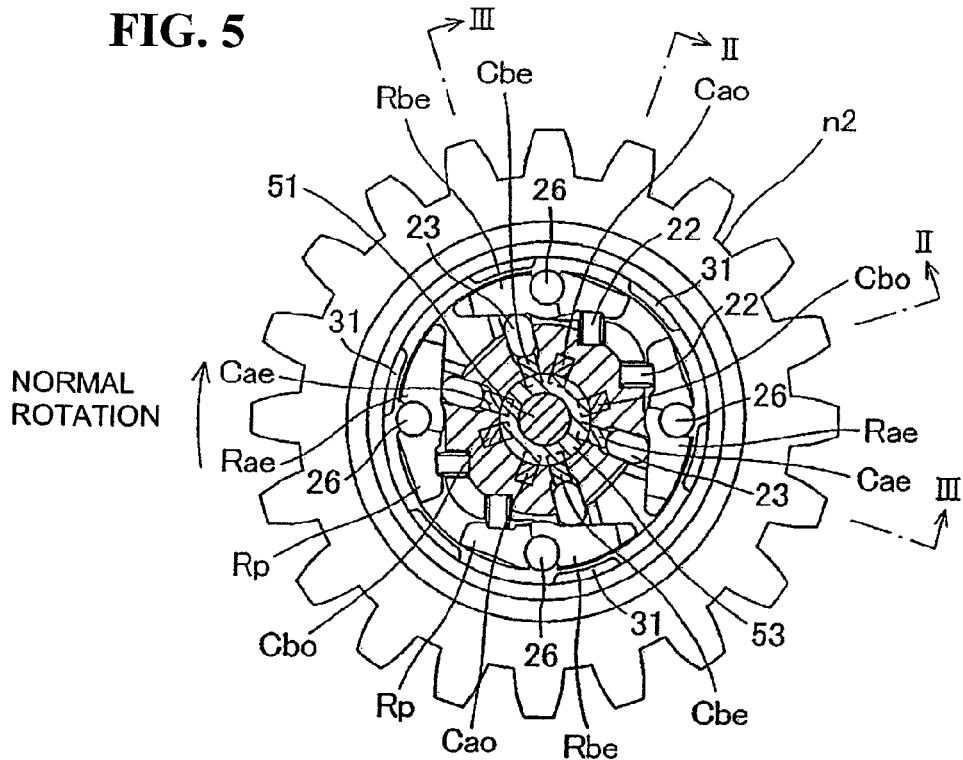
FIG. 5 is a cross-sectional view taken along line V-V of FIGS. 2 and 3.

The engaging projection 31 is formed like a thin circular arc as viewed in side elevation (as viewed from the axial direction in FIGS. 4 and 5). Both circumferential end faces of the engaging projection 31 are engaging faces each engaging the engaging claw portion Rp of the swing claw member R.

The normal rotation odd-numbered stage swing claw member Rao (the normal rotation even-numbered stage swing claw member Rae) and the reverse rotation odd-numbered stage engaging member Rbo (the reverse rotation even-numbered stage engaging member Rbe) have the respective engaging claw portions Rp, Rp extending in directions opposed to each other. The normal rotation odd-numbered stage swing claw member Rao (the normal rotation even-numbered stage swing claw member Rae) is abutted against and engaged with the engaging projection 31 in the normal rotation direction of the driven speed-change gear n (and of the counter gear shaft 12). The reverse rotation odd-numbered stage engaging member Rbo (the reverse rotation even-numbered stage engaging member Rbe) is abutted against and engaged with the engaging projection 31 in the reverse rotation direction of the driven speed-change gear n.

Incidentally, the normal rotation odd-numbered stage swing claw member Rao (the normal rotation even-numbered stage swing claw member Rae) is not engaged with the engaging projection 31 in the reverse rotation direction of the driven speed-change gear n even if the engaging claw portion Rp projects outwardly. Similarly, the reverse rotation odd-numbered stage engaging member Rbo (the reverse rotation even-numbered stage engaging member Rbe) is not engaged with the engaging projection 31 in the normal rotation direction of the driven speed-change gear n even if the engaging claw portion Rp projects outwardly.

A description is given of a procedure for assembling the above-described engaging means 20 to the counter gear shaft 12.

The two left and right lost motion mechanisms 52, 53 are assembled to the control rod 51 attached with the control rod operating element 55 and with the engaging pin 59. The eight cam rods Cao, Cao, Cae, Cae, Cbo, Cbo, Cbe and Cbe are arranged on the outer circumference of the lost motion mechanisms 52 and 53. In this state, these are insertably fitted into the hollow of the counter gear shaft 12.

In this case, the eight cam rods Cao, Cao, Cae, Cae, Cbo, Cbo, Cbe and Cbe are each inserted into a corresponding one of the eight cam guide grooves 12g.

In addition, the right-left movement position of the eight cam rods Cao, Cao, Cae, Cae, Cbo, Cbo, Cbe and Cbe with respect to the counter gear shaft 12 is set to a neutral position.

The counter gear shaft 12 in this state is raised upright with the left up.

As illustrated with solid lines in FIG. 12, first, the right end collar member 13 is externally provided at the lower end (the right end) of the central cylindrical section 12a. Then, the pin members 23 are inserted into the pin holes 12h of the circumferential groove 12cv corresponding to the lowest first driven speed-change gear n1. While one ends of the compression springs 22 are supported by the spring-receiving portions 12d, the swing claw members R are fitted into the long rectangular recessed portions 12p, the short rectangular recessed portions 12q and the circumferential groove 12cv. The spindle pins 26 are fitted into the axial grooves 12av inside the right end bearing collar member 13. At the same time, the spindle pins 26 are fitted into the bearing recessed portions Rd of the swing claw members R for assembling the swing claw member R.

When the cam rod C is located at the neutral position, the pin members 23 come into contact with and advance along the slidable contact surface other than the cam grooves and presses from the inside the pin-receiving portions Rq of the swing claw members R for swing against the biasing force of the compression springs 22. This allows the engaging claw portions Rp to sink into the long recessed portions 12p. Thus, nothing projects outwardly from the outer circumferential surface of the central cylindrical section 12a.

The four swing claw members R in the circumferential groove 12cv corresponding to the first driven speed-change gear n1 are assembled. Thereafter, the first driven speed-change gear n1 is insertably fitted from above so as to bring the projecting ridges 30 of the first driven speed-change gear n1 into abutment against the bearing collar member 13 and into engagement with the notches for assembly. Next, the second bearing collar member 13 is insertably fitted from above so as to be engaged with the notches of the first driven speed-change gear n1 and externally provided on the counter gear shaft 12 at a given position. Thus, the first driven speed-change gear n1 is axially positioned for attachment.

Next, the engaging means 20 for the second driven speed-change gear n2 is assembled and the second driven speed-change gear n2 are assembled. Thereafter, this work is repeated to sequentially assemble the remaining third, fourth, fifth and sixth driven speed-change gears n3, n4, n5 and n6. Lastly, the seventh bearing collar member 13 is externally provided.

In the state where the six driven speed-change gears n are assembled to the counter gear shaft 12 as described above, the counter gear shaft 12 is rotatably supported by the left and right bearings 7L, 7R fitted respectively to the left engine case 1L and the sidewall 1RR of the right engine case 1R so as to be put between the collar members 14L and 14R. Thus, the six driven speed-change gears n and the seven bearing collar members 13 are alternately assembled and are gripped from the right and left so as to be axially positioned.

The bearing collar members 13 can carry the axial force of the driven speed-change gears n, perform the axial positioning thereof and receive the thrust force thereof.

In this way, the first, second, third, fourth, fifth and sixth driven speed-change gears n1, n2, n3, n4, n5 and n6 can rotatably be supported by the counter gear shaft 12 via the bearing collar members 13.

Since the cam rods C are each located at the neutral position, all the driven speed-change gears n are in the disengagement state where the movement position of the cam rods C of the corresponding engaging means 20 allows the pin members 23 to project and press from the inside the pin-receiving portions Rq of the swing claw members R, thereby inwardly retracting the engaging claw portions Rp. In this state, all the driven speed-change gears n are rotated freely from the counter gear shaft 12.

On the other hand, the driven speed-change gear n may be in the engageable state where the movement position, other than the neutral position, of the cam rods C of the engaging means 20 allows the pin members 23 to go into the cam grooves v and swing the swing claw members R, thereby allowing the engaging claw portions Rp to project outwardly. In such a case, the engaging projections 31 of the corresponding driven speed-change gear n come into abutment against the engaging claw portions Rp. Thus, the rotation of the driven speed-change gear n is transmitted to the counter gear shaft 12 or the rotation of the counter gear shaft 12 is transmitted to the driven speed-change gear n.

In the shift drive means 50, the shift select lever is manually operated to turn the shift drum 67 by a given amount. The turning of the shift drum 67 axially move the control rod 51 by a given amount via the shift pin 58 fitted to the shift groove 67v to move the eight cam rods Cao, Cao, Cae, Cae, Cbo, Cbo, Cbe and Cbe of the engaging means 20 via the lost motion mechanisms 52 and 53.

The axial movement of the cam rods C allows the pin members 23 in slidable contact with the cam surface of the cam rods C to advance and retract while going into and coming out from the cam grooves v to swing the swing claw members R. The swing of the swing claw member R releases the engagement with a driven speed-change gear n and establishes engagement with another driven speed-change gear n, thereby changing the driven speed-change gear n engaged with the counter gear shaft 12 for shifting.

Incidentally, as the shift drive means, the shift select lever is manually operated to turn the shift drum 67 for shifting; however, a shift drive motor may be driven to turn the shift drum via a Geneva stop, etc., for shifting.

A description is hereinafter given of a process for upshift from a first-speed state to a second-speed state reduced in reduction ratio by one stage during acceleration resulting from the drive of the internal combustion engine with reference to FIGS. 13(a)-(d) to 17(a)-(d).

FIGS. 13(a)-(d) to 17(a)-(d) illustrate sequentially temporal changes. In each drawing, FIGS. 13-17(a) are cross-sectional view in which the gears, etc. of FIG. 2 (the cross-sectional view taken along line II-II of FIGS. 4 and 5) are omitted. FIGS. 13-17(b) are cross-sectional view in which the gears, etc. of FIG. 3 (the cross-sectional view taken along line III-III of FIGS. 4 and 5) are omitted. FIGS. 13-17(c) are cross-sectional views taken along lines c-c of FIGS. 13-17(a) and FIG. 13-17(b) (the cross-sectional view of the first driven speed-change gear n1). FIGS. 13-17(d) are cross-sectional views taken along lines d-d of FIGS. 13-17(a) and FIG. 13-17(b) (the cross-sectional view of the first driven speed-change gear n2).

The power of the internal combustion engine is transmitted to the main gear shaft 11 via the friction clutch 5 to integrally rotate the first, second, third, fourth, fifth and sixth drive speed-change gears m1, m2, m3, m4, m5 and m6. Thus, the first, second, third, fourth, fifth and sixth driven speed-change gears n1, n2, n3, n4, n5 and n6 constantly meshing with the drive speed-change gears m1 to m6, respectively, are rotated at respective rotation speeds.

FIGS. 13(a)-(d) illustrate the first-speed state. In FIG. 13(c), the first driven speed-change gear n1 is rotated in an arrow direction. In FIG. 13(d), the second driven speed-change gear n2 is rotated in an arrow direction. The second driven speed-change gear n2 is rotated at higher speed than the first driven speed-change gear n1.

Only the pin members 23 of the engaging means 20 corresponding to the first driven speed-change gear n1 are put in the cam grooves v1 of the normal rotation odd-numbered stage cam rod Cao (see FIG. 13(a)). The normal rotation odd-numbered swing claw members Rao of the engaging means 20 allow the engaging claw portions Rp to project outwardly. The engaging projections 31 of the rotating first driven speed-change gear n1 come into engagement with the engaging claw portions Rp of the normal rotation odd-numbered swing claw members Rao (see FIG. 13(c)). Thus, the counter gear shaft 12 is rotated together with the first driven speed-change gear n1 at the same rotation speed as that of the first driven speed-change gear n1.

Incidentally, in FIGS. 13(a)-(d) to 20(a)-(d), the swing claw member R and the engaging projection 31 that provide effective power transmission are lattice-hatched.

In this first-speed state, for the second driven speed-change gear n2, the pin members 23 of the corresponding engaging means 20 come out of the cam grooves v2 of the even-numbered stage cam rods Cae, Cbe (see FIG. 13(b)) to allow the even-numbered swing claw members Rae, Rbe of the engaging means 20 to retract the engaging claw portions Rp inwardly. Thus, the second driven speed-change gear n2 runs idle.

Similarly, also the other, i.e., the third, fourth, fifth and sixth driven speed-change gears n3, n4, n5 and n6 run idle (see FIG. 13(a) and FIG. 13(b)).

Now, the shift select lever is manually operated to upshift to the second-speed. The shift drum 67 is turned to begin to move the control rod 51 axially rightward, which simultaneously moves the eight cam rods Cao, Cao, Cae, Cae, Cbo, Cbo, Cbe and Cbe in the axially rightward via the coil springs 52s and 53s of the lost motion mechanisms 52 and 53.

Figure 14A:
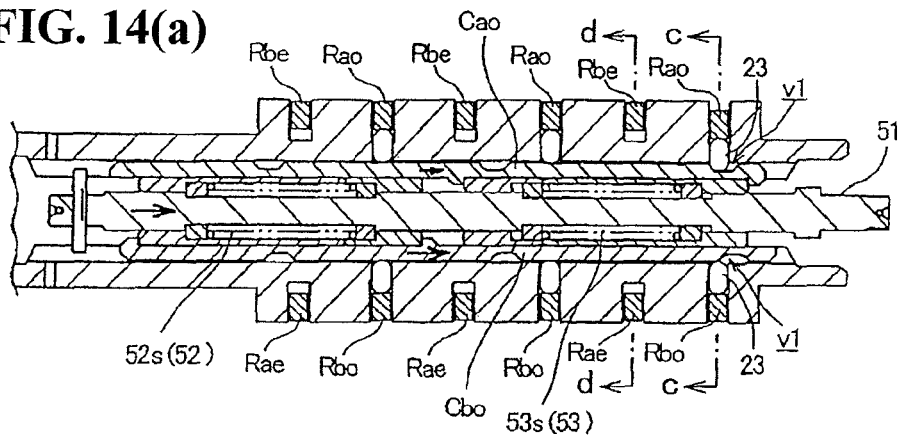
FIGS. 14(a)-(d) include explanatory views illustrating one process in the middle of upshift operation.
Figure 14B:
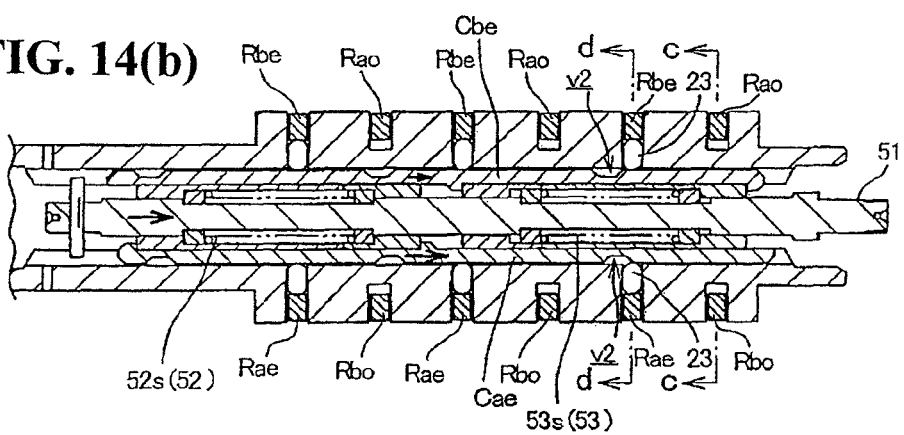
Figures 14C, 14D:
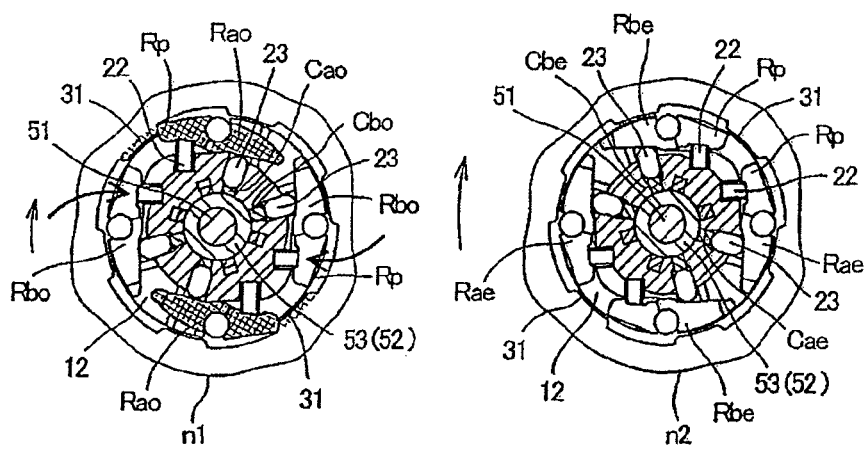
Figure 16A:
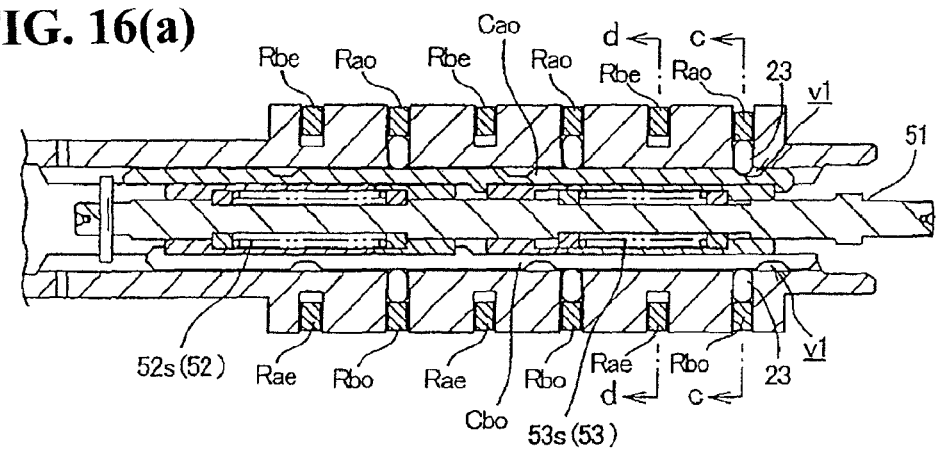
Figure 16B:
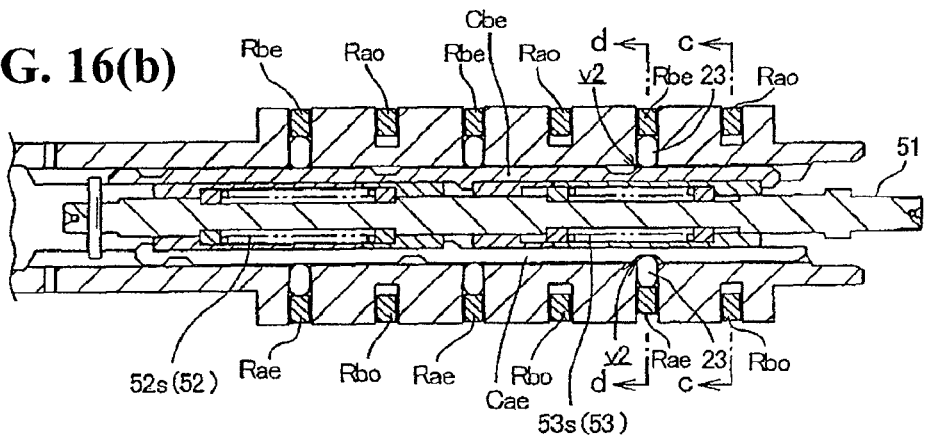
Figure 16B:
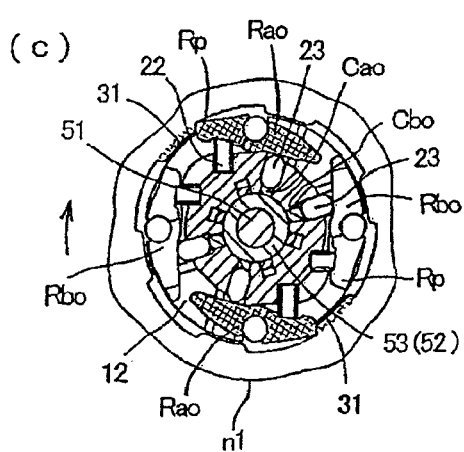
Figure 16B:
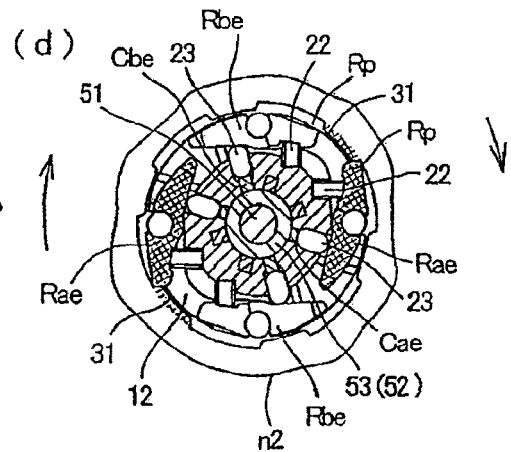
Figure 17A:
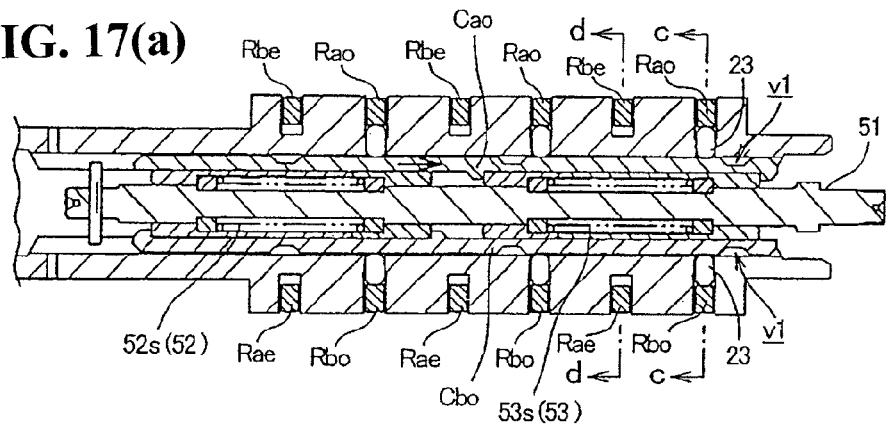
Figure 17B:
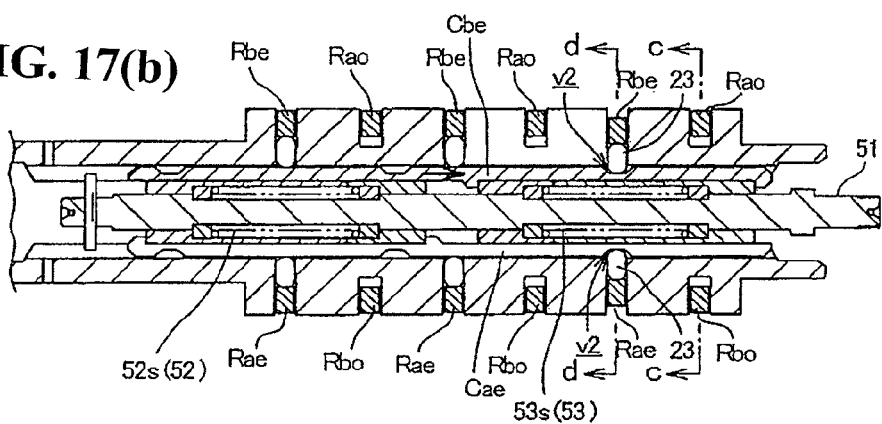
Figure 17B:
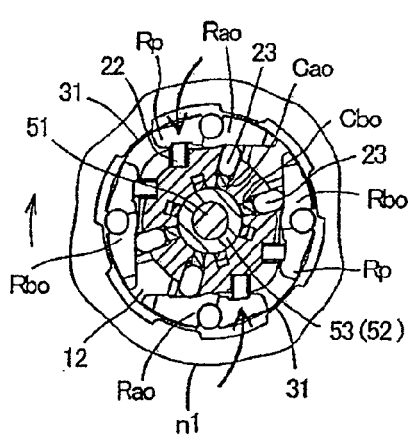
Figure 17B:
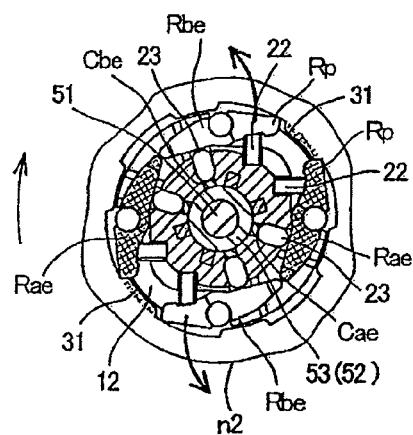
Figure 20A:
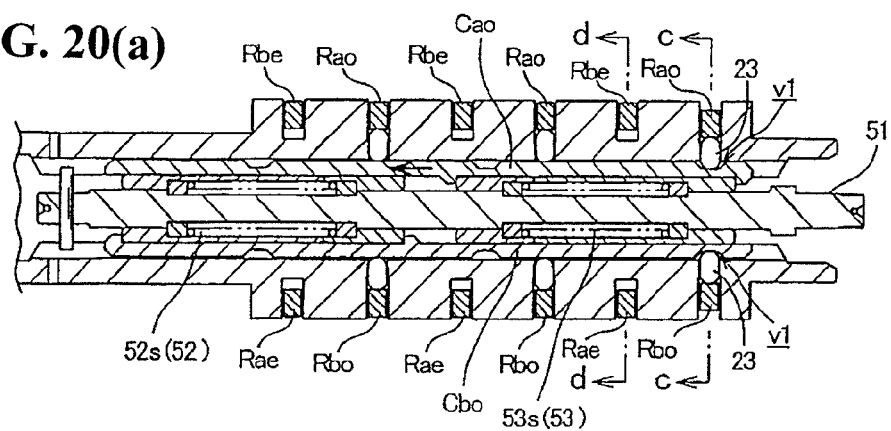
Figure 20B:
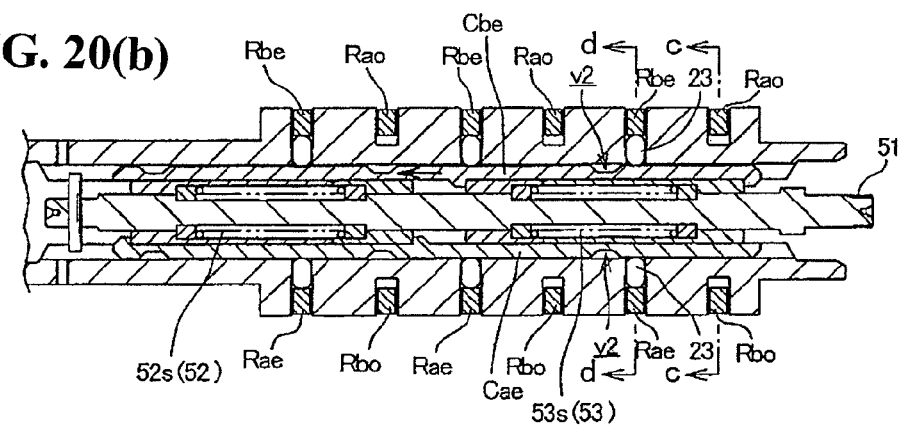
Figure 20B:
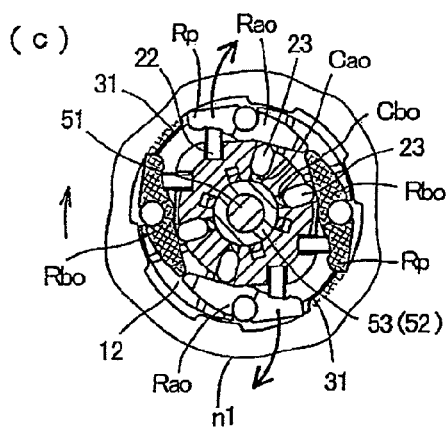
Figure 20B:
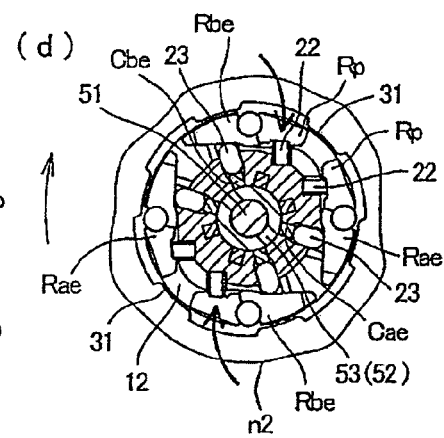

With reference to FIG. 14(a) and FIG. 14(c), the reverse rotation odd-numbered stage swing claw members Rbo operated via the pin members 23 do not engage with the engaging projections 31 of the first driven speed-change gear n1. Therefore, the reverse rotation odd-numbered stage cam rods Cbo on one side are moved without much resistance to allow the pin members 23 put in the cam grooves v1 to come out therefrom for projection (see FIG. 14(a)). These projections of the pin members 23 swing the reverse rotation odd-numbered stage swing claw members Rbo to retract the engaging claw portions inwardly (see FIG. 14(c)).

In contrast, the normal rotation odd-numbered swing claw members Rao operated via the pin members 23 come into engagement with the engaging projections 31 of the first driven speed-change gear n1 to receive power from the first driven speed-change gear n1. Therefore, the normal rotation odd-numbered cam rods Cao on the other side receive such significantly large friction resistance for swinging the normal rotation odd-numbered stage swing claw members Rao to disengage. Even if the normal rotation odd-numbered stage cam rod Cao is tried to be moved by the force of the coil spring 53s of the lost motion mechanism 53 to allow the pin members 23 to project along the inclined lateral surfaces of the cam grooves V1, the normal rotation odd-numbered stage swing claw members Rao cannot be lifted for swing. Specifically, the normal rotation odd-numbered cam rods Cao are stopped when the pin members 23 are about to ride on the inclined lateral surfaces of the cam grooves v1. That is to say, the engagement cannot be released unchanged (see FIG. 14(a) and FIG. 14(c)).

In the state illustrated in FIGS. 14(a)-(d), for the second driven speed-change gear n2, while the normal rotation even-numbered stage cam rods Cae move without resistance, the pin members 23 do not go far enough to go into the cam grooves v2 so that the even-numbered stage swing claw members Rae and Rbe remain unchanged (see FIG. 14(b) and FIG. 14(d)).

Incidentally, the normal rotation odd-numbered stage cam rods Cao stop together with the spring holder 53h, engaging therewith, of the lost motion mechanism 53. Therefore, also the reverse rotation even-numbered stage cam rods Cbe engaging with the spring holder 53h is stopped.

In the state where the normal rotation odd-numbered cam rods Cao are stopped, when the control rods 51 are further moved and reach the second-speed position, also the normal rotation even-numbered cam rods Cae are further rightward moved along with the reverse rotation odd-numbered stage cam rods Cbo. Then, as illustrated in FIG. 15(b), the pin members 23 go into the cam grooves v2 of the normal rotation even-numbered stage cam rods Cae. Thus, the normal rotation even-numbered stage swing claw members Rae are swung by the biasing forces of the compression springs 22 and the centrifugal forces of the engaging claw portions Rp to allow the engaging claw portions Rp to project outward (see FIG. 15(d)).

Incidentally, the reverse rotation even-numbered stage cam rods Cbe remain stopped so that also the reverse rotation even-numbered stage swing claw members Rbe allow the engaging claw portions Rp to remain inwardly retracted.

In this way, the engaging projections 31 of the second driven speed-change gear n2 rotating at higher speed than the counter gear shaft 12 rotating together with the first driven speed-change gear n1 catch up with and come into abutment against the outward projecting engaging claw portions Rp of the normal rotation even-numbered step swing claw members Rae (see FIG. 16(d)).

With reference to FIG. 16(c) and FIG. 16(d), at this moment, the abutment of the engaging projections 31 of the second driven speed-change gear n2 against the normal rotation even-numbered stage swing claw members Rae occur concurrently with the abutment of the engaging projections 31 of the first driven speed-change gear n1 against the normal rotation odd-numbered stage swing claw members Rao.

In this way, immediately thereafter, the second driven speed-change gear n2 rotating at higher speed allows the counter gear shaft 12 to begin to rotate at the same rotation speed as the second driven speed-change gear n2 (see FIG. 17(d)). This rotation causes the engaging claw portions Rp of the normal rotation odd-numbered stage swing claw members Rao to disengage from the engaging projections 31 of the first driven speed-change gears n1, executing actual upshift from the first-speed to the second-speed.

The disengagement of the engaging claw portions Rp of the normal rotation odd-numbered stage swing claw members Rao from the engaging protrusions 31 of the first driven speed-change gear n1 eliminates friction resistance acting to secure the normal rotation odd-numbered stage swing claw members Rao. Thereafter, the normal rotation odd-numbered stage cam rods Cao biased by the coil spring 53s of the lost motion mechanism 53 are moved rightward so that the pin members 23 put in the cam grooves v1 come out therefrom. Thus, the normal rotation odd-numbered stage swing claw members Rao are swung to allow the engaging claw portions Rp to be retracted inwardly (see FIG. 17(c)).

The movement of the normal rotation odd-numbered stage cam rods Cao moves also the reverse rotation even-numbered stage cam rods Cbe via the spring holder 53h of the lost motion mechanism 53. The pin members 23 go into the cam grooves v2 of the reverse rotation even-numbered stage cam rods Cbe to swing the reverse rotation even-numbered stage swing claw members Rbe, which allows the engaging claw portions Rp to project outwardly, completing shifting (see FIG. 17(d)).

In this way, the shifting operation from the first-speed to the second-speed is completed. The state illustrated in FIGS. 17(a)-(d) is a second-speed state.

As described above, when upshift is executed from the first-speed state to the second-speed state reduced in reduction ratio by one stage, as illustrated in FIGS. 16(a)-(d), the engaging projections 31 of the first driven speed-change gear n1 come into abutment against and engagement with the engaging claw portions Rp of the normal rotation odd-numbered stage claw members Rao. In the state where the counter gear shaft 12 is rotated at the same speed as the first driven speed-change gear n1, the engaging projections 31 of the second driven speed-change gear n2 rotating at higher speed catches up with and comes into abutment against the engaging claw portions Rp of the normal rotation even-numbered stage swing claw members Rae. The counter gear shaft 12 is rotated at higher speed along with the second driven speed-change gear n2 for executing shift. The engaging claw portions Rp of the normal rotation odd-numbered stage swing claw members Rao naturally move away from the engaging projections 31 of the first driven speed-change gear n1 for smooth disengagement. Thus, the smooth upshift can be executed through the smooth operation without force for releasing the engagement.

Similarly, upshift from the second-speed to the third-speed, from the third-speed to the fourth-speed, from the fourth-speed to the fifth-speed, from the fifth-speed to the sixth-speed is as below. In the state where the driven speed-change gear n is engaged with the swing claw members R, the driven speed-change gear n reduced in reduction ratio by one stage comes into engagement with the swing claw members R for executing upshift. In this way, the smooth upshift can be executed, without the necessity of a shift clutch, through smooth operation without force for releasing the engagement, without any loss of switching time during the upshift, without escape of the driving force, and with a reduced shift shock.

For example, in the first-speed state, as illustrated in FIG. 13(c), the normal rotation odd-numbered swing claw members Rao are engaged with the engaging projections 31 of the first driven speed-change gear n1 and at the same time the engaging claw portions Rp of the reverse rotation odd-numbered stage swing claw members Rbo on the other side is located close to the engaging projections 31 in such a state as to be engageable therewith.

Vehicle speed may be reduced so that a driving force is applied from the rear wheel to the counter gear shaft 12 to change the direction of the drive force. In such a case, the engagement of the engaging projections 31 of the first driven speed-change gear n1 is promptly switched from the normal rotation odd-numbered claw members Rao to the reverse rotation odd-numbered stage swing claw members Rbo. Thus, the engagement can smoothly be taken over and maintained.

A description is next given of a process for downshift from the second-speed state to the first-speed state increased in reduction ratio by one stage during reducing vehicle speed with reference to FIGS. 18(a)-(d) to 20(a)-(d).

FIGS. 18(a)-(d) illustrate a speed-change state being in the second-speed state immediately after speed reduction.

Speed reduction allows the drive force to act on the counter gear shaft 12 from the rear wheel. As illustrated in FIG. 18(d), the engaging claw portions Rp of the reverse rotation even-numbered stage swing claw members Rbe in the engageable state are brought into engagement with the engaging projections 31 of the second driven speed-change gear n2 lowering in rotation speed. This engagement transmits the rotational power of the counter gear shaft 12 to the second driven speed-change gear n2, that is, the so-called engine brake works.

In this state, to downshift to the first-speed, the shift select lever is manually operated to turn the shift drum 67 in the direction reverse to the above-description by a given amount to move the control rod 51 axially leftward. This movement is about to simultaneously move the eight cam rods Cao, Cao, Cae, Cae, Cbo, Cbo, Cbe and Cbe via the coil springs 52s and 53s of the lost motion mechanisms 52 and 53 axially leftward. However, the reverse rotation even-numbered stage swing claw members Rbe operated via the pin members 23 come into engagement with the engaging projections 31 of the second driven speed-change gear n2 to receive the power from the second driven speed-change gear n2. Therefore, the reverse rotation even-numbered stage cam rods Cbe receive such significantly large friction resistance as to swing the reverse rotation even-numbered stage swing claw members Rbe for releasing the engagement. When the pin members 23 are about to ride on the inclined lateral surface of the cam grooves v2, the reverse rotation even-numbered stage cam rods Cbe are stopped so that the engagement remains not released (see FIG. 19(b) and FIG. 19(d)).

Incidentally, also the normal rotation odd-numbered stage cam rods Cao along with the reverse rotation even-numbered stage cam rods Cbe is in the stopped state via the spring holder 53h of the lost motion mechanism 53.

On the other hand, the normal rotation even-numbered stage swing claw members Rae operated via the pin members 23 are not engaged with the engaging projection 31 of the second driven speed-change gear n2. Therefore, the normal rotation even-numbered stage cam rods Cae are moved leftward without so much resistance to allow the pin members 23 put in the cam grooves v2 to come out therefrom for projection. This swings the normal rotation odd-numbered swing claw members Rae to inwardly retract the engaging claw portions Rp (see FIG. 19(d)).

In the first driven speed-change gear n1, the reverse rotation odd-numbered stage cam rods Cbo are moved leftward without resistance to allow the pin members 23 to go into the cam grooves v1 of the reverse rotation odd-numbered stage cam rods Cbo (see FIG. 19(a)). In addition, the reverse rotation odd-numbered swing claw members Rbo are swung by the biasing forces of the compression springs 22 and by the centrifugal forces of the engaging claw portions Rp to allow the engaging claw portions Rp to project outwardly (see FIG. 19(c)).

After the normal rotation even-numbered stage swing claw members Rae have retracted the engaging claw portions Rp inwardly, the reverse rotation odd-numbered stage swing claw members Rbo allow the engaging claw portions Rp to project outwardly.

The reverse rotation odd-numbered stage swing claw members Rbo rotate together with the counter gear shaft 12 and catch up with and come into abutment against the engaging projections 31 of the first driven speed-change gears n1. In this case, as illustrated in FIG. 19(c) and FIG. 19(d), there is a moment when the engaging projections 31 of the second driven speed-change gear n2 and the engaging projections 31 of the first driven speed-change gear n1 come into simultaneous abutment against the engaging claw portions Rp of the reverse rotation even-numbered stage swing claw members Rbe and the engaging claw portions Rp of the reverse rotation odd-numbered stage swing claw members Rbo, respectively.

Immediately thereafter, the engagement with the first driven speed-change gear n1 rotating at lower speed becomes effective and the engagement with the second driven speed-change gear n2 is released, thus executing the downshift from the second-speed to the first-speed.

The engagement between the engaging projections 31 of the second driven speed-change gear n2 with the reverse rotation even-numbered stage cam rods Cbe is released to eliminate friction resistance acting to secure the reverse rotation even-numbered stage swing claw members Rbe. Then, the reverse rotation even-numbered stage cam rods Cbe biased by the coil spring 53s of the lost motion mechanism 53 is moved leftward to allow the pin members 23 put in the cam grooves v2 to come out therefrom (see FIG. 20(b)). This swings the reverse rotation even-numbered swing claw members Rbe to retract the engaging claw members Rp inwardly (see FIG. 20(d)).

The movement of the reverse rotation even-numbered stage cam rods Cbe moves also the normal rotation odd-numbered stage cam rods Cao via the spring holder 53h of the lost motion mechanism 53 to allow the pin members 23 to go into the cam grooves v1 of the normal rotation odd-numbered stage cam rods Cao. This swings the normal rotation odd-numbered stage swing claw members Rao to allow the engaging claw members Rp to project outwardly, thus completing the shifting (see FIG. 20(c)).

In this state, the shifting operation from the second-speed to the first-speed is completed.

As describe above, when downshift is executed from the second-speed state to the first-speed state increased in reduction ratio by one stage, as illustrated in FIGS. 19(a)-(d), the engaging claw portions Rp of the reverse rotation even-numbered stage swing claw members Rbe come into abutment against and into engagement with the engaging protrusions 31 of the second speed-change gear n2. In this state, the engaging claw portions Rp of the reverse rotation odd-numbered stage swing claw members Rbo catch up with and come into abutment against the engaging protrusions 31 of the first driven speed-change gear n1 rotating at lower speed for switching the engagement. The engagement between the engaging protrusions 31 of the second driven speed-change gear n2 and the engaging claw portions Rp of the reverse rotation odd-numbered stage claw members Rbe is smoothly released. Thus, smooth downshift can be executed through the smooth operation without the necessity of force for releasing the engagement.

Similarly, downshift from the sixth-speed to the fifth-speed, from the fifth-speed to the fourth-speed, from the fourth-speed to the third-speed and from the third-speed to the second-speed is as below. In the state where the driven speed-change gear n is engaged with the swing claw members R, the swing claw members R come into engagement with the driven speed-change gear n increased in reduction ratio by one stage for executing downshift. In this way, the smooth downshift can be executed through smooth operation without the necessity of force for releasing the engagement, without the necessity of a shift clutch, without any loss of switching time during the downshift, without escape of the driving force, and with a reduced shift shock.

For example, in the second-speed state, as illustrated in FIG. 18(d), the reverse rotation even-numbered step swing claw members Rbe are engaged with the engaging projections 31 of the second speed-change gear n2 and at the same time the engaging claw members Rp of the normal rotation even-numbered stage swing claw members Rae on the other side are located close to the engaging projections 31 and in such a state as to be engageable with the projections 31.

Vehicle speed may be increased so that the driving force is applied from the internal combustion engine to the second driven speed-change gear n2 to change the direction of the drive force. In such a case, the engagement of the engaging projections 31 of the second driven speed-change gear n2 is promptly switched from the reverse rotation even-numbered stage swing claw members Rbe to the normal rotation even-numbered stage swing claw members Rae. Thus, the engagement can smoothly be taken over and maintained.

Incidentally, during acceleration caused by the drive of the internal combustion engine, even if the control rod 51 is moved axially rightward in order to execute downshift, the multistage transmission 10 of the present embodiment cannot release the engagement between the driven speed-change gear n and the swing claw members R transmitting power therebetween if nothing is done. Consequently, to execute downshift during the acceleration, the friction clutch 5 is temporarily disengaged to reduce speed before shifting operation. In this state, the shifting operation is executed to smoothly switch to the engagement between the swing claw members R and the driven speed-change gear n increased in reduction ratio by one stage. Then, the friction clutch 5 is engaged for the acceleration.

If the friction clutch 5 is not used, the rotation speed of the driven speed-change gear n is temporarily lowered by drive source rotation speed reduction means such as ignition timing control or fuel injection amount control. Thus, downshift can smoothly be executed even during acceleration.

When vehicle speed is reduced so that a drive force is applied from the rear wheel to the counter gear shaft 12, if the control rod 51 is moved axially leftward in order to execute upshift, such shift cannot be executed. Thereafter, when acceleration is executed, the driven speed-change gear n reduced in reduction ratio by one stage is engaged with the swing claw members R to cause a possible shift shock. Therefore, upshift operation during deceleration is prohibited to make it possible to prevent the occurrence of the shift shock.

The cam rods C fitted to the cam grooves 12g formed on the hollow inner circumferential surface of the counter gear shaft 12 are axially moved to advance and retract the pin members 23 fitted into the desired positions of the counter gear shaft 12, thereby swinging the swing claw members R. In this way, the engagement with and disengagement from the engaging projections 31 of the driven speed-change gear n are executed. The cam rods C are moved only by a small amount to thereby advance and retract the desired pin members 23 to switch the engagement for shifting. Thus, the configuration can be enabled in which the adjacent driven speed-change gears n supported by the counter gear shaft 12 are made close to each other as illustrated in FIG. 1. This can reduce the axial width of the multistage transmission 10.

According to the present constant-mesh type multistage transmission 10, when the shift drive means 50 executes upshift to a one-stage-upper speed-change stage reduced in reduction ratio by one stage, the normal rotation odd-numbered stage cam rods Cao and the normal rotation even-numbered stage cam rods Cae alternately operate the normal rotation odd-numbered stage swing claw members Rao and the normal rotation even-numbered stage swing claw members Rae for shifting. In the state where the one swing claw members R are engaged with the driven speed-change gear n, the other swing claw members R are engaged with the driven speed-change gear n of a one-stage-upper speed-change stage for shifting. At this time, due to the rotation speed difference between the associated gears, the engagement of the one-stage-upper driven speed-change gear n with the counter gear shaft 12 by the other swing claw members R smoothly releases the engagement of the one-stage-lower driven speed-change gear n with the counter gear shaft 12 by the one swing claw members R. Thus, the multiple transmission smoothly operates without the necessity of force for the disengagement to eliminate a shift clutch. In addition, the multiple transmission does not cause a loss of the switching time during upshift at all and also does not cause escape of a drive force and reduces a shift shock so as to execute smooth upshift.

When the shift drive means 50 executes downshift to a one-stage-lower speed-change stage increased in reduction ratio by one stage, the reverse rotation odd-numbered stage cam rods Cbo and the reverse rotation even-numbered stage cam rods Cae alternately operate the reverse rotation odd-numbered stage swing claw members Rbo and the reverse rotation even-numbered stage claw members Rbe for shifting. In the state where the one swing claw members R are engaged with the driven speed-change gear n, the other swing claw members R are engaged with the driven speed-change gear n of a one-stage-lower speed-change stage for shifting. At this time, due to the rotation speed difference between the associated driven speed-change gears n, the engagement of the one-stage-lower driven speed-change gear n with the counter gear shaft 12 by the other swing claw members R smoothly releases the engagement of the one-stage-upper driven speed-change gear n with the counter gear shaft 12 by the one swing claw members R. Thus, the multistage transmission smoothly operates without the necessity of force for the disengagement to eliminate a shift clutch. In addition, the multiple transmission does not cause a loss of the switching time during downshift at all and also does not cause escape of a drive force and reduces a shift shock so as to execute smooth downshift.

According to the present multistage transmission 10, the right lost motion mechanism 53 moves the normal rotation odd-numbered stage cam rods Cao and the reverse rotation even-numbered stage cam rods Cbe simultaneously with the control rod 51. The left lost motion mechanism 52 moves the normal rotation even-numbered stage cam rods Cae and the reverse odd-numbered stage cam rods Cbo simultaneously with the control rod 51. In this way, the two lost motion mechanisms 52 and 53 can move the four kinds of the cam rods Cao, Cae, Cbo and Cbe simultaneously with the single control rod 51. Thus, the number of component parts can be reduced to simplify the configuration.

Incidentally, the odd-numbered stage cam grooves v1, v3 and v5 of the normal rotation odd-numbered stage cam rod Cao and the even-numbered stage cam grooves v2, v4 and v6 of the reverse rotation odd-numbered cam rod Cbe are each formed on the single cam rod as a first common cam rod. The even-numbered stage cam grooves v2, v4 and v6 of the normal rotation even-numbered stage cam rod Cae and the odd-numbered stage cam groove V1, v3 and v5 of the reverse rotation odd-numbered stage cam rod Cbo are each formed on the single cam rod as a second common cam rod. Thus, the kinds of the cam rods can be made two so that the number of component parts can further be reduced to simplify the configuration.

According to the multistage transmission 10, the cam members C (Cao, Cae, Cbo, Cbe) of the engaging means 20 are each an axially elongated prismatic bar member rectangular in cross-section and is formed with the cam face formed with the cam grooves v on the lateral surface. Thus, the cam member C can easily be manufactured from the rectangular prismatic bar member that does not have a special shape in cross-section but has a simple outer shape.

The width of the cam guide groove 12g, of the counter gear shaft 12, adapted to receive the cam member C slidably fitted thereinto is smaller than that of the pin member 23. Therefore, the pin member 23 advanced and retracted in the pin hole 12h does not fall off from the cam guide groove 12g and the assembly of the engaging means 20 to the counter gear shaft 12 can be facilitated.

The control rod 51 inwardly supporting and sliding the cam members C is inserted into the hollow of the counter gear shaft 12. In addition, the engaging pin 59 which is a locking pin member radially passing through the end portion of the control rod 51 is slidably engaged with the cam guide grooves 12g adapted to guide the cam members C of the counter gear shaft 12. Thus, the locking of the control rod 51 with respect to the counter gear shaft 12 can easily be configured using the cam guide grooves 12g.

According to the multistage transmission 10, the right lost motion mechanism 53 is adapted to move the normal rotation odd-numbered stage cam rods Cao and the reverse rotation even-numbered stage cam rods Cbe simultaneously with the control rod 51. In addition, the left lost motion mechanism 52 is adapted to move the normal rotation even-numbered stage cam rods Cae and the reverse rotation odd-numbered stage cam rods Cbo simultaneously with the control rod 51. Therefore, the four kinds of cam rods Cao, Cae, Cbo, Cbe can be moved simultaneously with the single control rod 51 by the two lost motion mechanisms 52 and 53. Thus, the number of component parts can be reduced to simplify the configuration.

As described above, two of the lost motion mechanisms 52 and 53 of the multistage transmission 10 are axially provided on the control rod 51 so as to simultaneously move the cam rods C different from each other. Therefore, the movement of the single control rod 51 allows the plurality of cam rods C to execute two kinds of different movements, allowing for smooth shifting. In addition, the lost motion mechanisms 52, 53 are configured symmetrically to curb manufacturing costs and to facilitate parts management during assembly.

According to the multistage transmission 10, the lost motion mechanisms 52, 53 are interposed between the outer circumferential surface of the control rod 51 and the inner surface of the plurality of cam rods C. Therefore, in the hollow of the counter gear shaft 12 the control rod 51, the lost motion mechanisms 52, 53 and the cam rods C are configured to radially overlap one another, which can avoid the axial enlargement of the multistage transmission 10. In addition, the lost motion mechanisms 52, 53 are compactly housed in the hollow of the counter gear shaft 12 to downsize the multistage transmission 10 per se.

The lost motion mechanism 52 is interposed in a space, via the coil spring 52s, defined between the inner circumferential recessed section 52ha of the spring holder 52h interposed between the outer circumferential surface of the control rod 51 and the inner surfaces of the cam rods C, and the outer circumferential recessed section 51a of the control rod 51. Similarly, the lost motion mechanism 53 is interposed in a space, via the coil spring 53s, defined between the inner circumferential recessed section 53ha of the spring holder 53h interposed between the outer circumferential surface of the control rod 51 and the inner surfaces of the cam rods C, and the outer circumferential recessed section 51b of the control rod 51. Thus, the lost motion mechanisms 52 and 53 having the same shape can be configured on the control rod 51, which can reduce manufacturing costs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multistage transmission in which a plurality of drive gears and driven gears are rotatably supported by respective parallel gear shafts in a constant-mesh state for each speed-change stage, one of the plurality of drive gears and driven gears is secured to a gear shaft and engaging means provided between the other of the plurality of drive gears and driven gears and the gear shaft to establish engagement therebetween is switchably driven by shift drive means to execute shifting, the engaging means comprising:
normal rotation odd-numbered engaging members each adapted to bring an odd-numbered stage gear of an odd-numbered speed-change stage into engageable abutment against a gear shaft in a normal rotation direction of the gear to simultaneously rotate the odd-numbered stage gear and the gear shaft;
normal rotation even-numbered engaging members each adapted to bring an even-numbered stage gear of an even-numbered speed-change stage into engageable abutment against the gear shaft in a normal rotation direction of the gear to simultaneously rotate the even-numbered stage gear and the gear shaft;
a normal rotation odd-numbered cam rod adapted to come into axially movably slidable contact with a hollow inner circumferential surface of the gear shaft, formed with a plurality of odd-numbered stage cam grooves on a slidable contact surface at desired axial positions, and operating the normal rotation odd-numbered engaging members; and
a normal rotation even-numbered stage cam rod adapted to come into axially movably slidable contact with the hollow inner circumferential surface of the gear shaft, formed with a plurality of even-numbered stage cam grooves on a slidable contact surface at desired axial positions, and operating the normal rotation even-numbered engaging members,
wherein when the shift drive means executes upshift to a one-step-upper speed-change stage reduced in reduction ratio by one stage, the normal rotation odd-numbered stage cam rod and the normal rotation even-numbered stage cam rod alternately operate the normal rotation odd-numbered stage engaging members and the normal rotation even-numbered stage engaging members for shifting.

2. The multistage transmission according to claim 1, wherein
the engaging means includes:
reverse rotation odd-numbered engaging members each adapted to bring an odd-numbered stage gear of an odd-numbered speed-change stage into engageable abutment against the gear shaft in a reverse rotation direction of the gear to simultaneously rotate the odd-numbered stage gear and the gear shaft;
reverse rotation even-numbered engaging members each adapted to bring an even-numbered stage gear of an even-numbered speed-change stage into engageable abutment against the gear shaft in the reverse rotation direction of the gear to simultaneously rotate the even-numbered stage gear and the gear shaft;
reverse rotation odd-numbered cam rod adapted to come into axially movably slidable contact with a hollow inner circumferential surface of the gear shaft, formed with a plurality of odd-numbered stage cam grooves on a slidable contact surface at desired axial positions, and operating the reverse rotation odd-numbered engaging member; and a reverse rotation even-numbered stage cam rod adapted to come into axially movably slidable contact with the hollow inner circumferential surface of the gear shaft, formed with a plurality of even-numbered stage cam grooves on a slidable contact surface at desired axial positions, and operating the reverse rotation even-numbered engaging member, and when the shift drive means executes downshift to a one-step-lower speed-change stage increased in reduction ratio by one stage, the reverse rotation odd-numbered stage cam rod and reverse rotation even-numbered stage cam rod alternately operate the reverse rotation even-numbered stage engaging member and the reverse rotation even-numbered stage engaging member for shifting.

3. The multistage transmission according to claim 2, wherein the odd-numbered stage cam grooves of the normal rotation odd-numbered stage cam rod and the even-numbered stage cam grooves of the reverse rotation even-stage cam rod are formed on a single cam rod as a first common cam rod, and the even-numbered stage cam grooves of the normal rotation even-numbered stage cam rod and the odd-numbered stage cam grooves of the reverse rotation odd-stage cam rod are formed on a single cam rod as a second common cam rod.

4. The multistage transmission according to claim 2, wherein the shift drive means includes:

a control rod provided, at a hollow central axis of the gear shaft, inside each of the normal rotation odd-numbered stage cam rod, the normal rotation even-numbered stage cam rod, the reverse rotation odd-numbered cam rod, and the reverse rotation even-numbered stage cam rod; and a first lost motion mechanism and a second lost motion mechanism interposed between an outer circumferential surface of the control rod and an inner surface of each of the normal rotation odd-numbered stage cam rod, the normal rotation even-numbered stage cam rod, the reverse rotation odd-numbered cam rod and the reverse rotation even-numbered cam rod, the first lost motion mechanism allows the control rod to simultaneously move the normal rotation odd-numbered stage cam rod and the reverse rotation even-numbered stage cam rod, and the second lost motion mechanism allows the control rod to simultaneously move the normal rotation even-stage numbered cam rod and the reverse rotation odd-numbered stage cam rod.

5. The multistage transmission according to claim 3, wherein the shift drive means includes:

a control rod provided, at a hollow central axis of the gear shaft, inside each of the normal rotation odd-numbered stage cam rod, the normal rotation even-numbered stage cam rod, the reverse rotation odd-numbered cam rod, and the reverse rotation even-numbered stage cam rod; and a first lost motion mechanism and a second lost motion mechanism interposed between an outer circumferential surface of the control rod and an inner surface of each of the normal rotation odd-numbered stage cam rod, the normal rotation even-numbered stage cam rod, the reverse rotation odd-numbered cam rod and the reverse rotation even-numbered cam rod, the first lost motion mechanism allows the control rod to simultaneously move the normal rotation odd-numbered stage cam rod and the reverse rotation even-numbered stage cam rod, and the second lost motion mechanism allows the control rod to simultaneously move the normal rotation even-stage numbered cam rod and the reverse rotation odd-numbered stage cam rod.

6. The multistage transmission according to claim 5, wherein the control rod is formed at two, axially right and left, positions with outer circumferential recessed sections and each is reduced in diameter and extends by a predetermined length.

7. A multistage transmission in which a plurality of drive gears and driven gears are rotatably supported by respective parallel gear shafts in a constant-mesh state for each speed-change stage, one of the plurality of drive gears and driven gears is secured to a gear shaft and engaging means provided between the other of the plurality of drive gears and driven gears to establish engagement therebetween is switchably driven to execute shifting, the engaging means comprising:

an engaging portion circumferentially formed with an engaging surface at a desired circumferential position of an inner circumferential surface of each gear;

an engaging member provided in the gear shaft to engage with the engaging portion of the gear; and a cam member brought into axially movably slidable contact with the hollow inner circumferential surface of the gear shaft, formed with a cam surface on a slidable contact surface and moved to operate the engaging member;

wherein the gear shaft is formed with, on the hollow inner circumferential surface, a cam guide groove extending toward an axial direction to axially guide the cam member, and the cam member is an axially elongated prismatic bar member rectangular in cross-section and is slidably fitted into the cam guide groove.

8. The multistage transmission according to claim 7, wherein the engaging member includes:

a pin member fitted into a pin hole bored on a radially outside from the desired position of the cam guide groove and advanced and retracted while being in contact with the cam surface of the cam member; and a swing claw member pivotally supported by the gear shaft, and swung by the advancement and retraction of the pin member to establish engagement with an engaging surface of the engaging portion and release the engagement, and wherein a width of the cam guide groove is smaller than a width of the pin member.

9. The multistage transmission according to claim 7, wherein a control rod internally supporting and swinging the cam member is inserted into the hollow of the gear shaft, and a locking pin member radially passing through an end portion of the control rod is slidably engaged with the cam guide groove of the gear shaft.

10. The multistage transmission according to claim 8, wherein a control rod internally supporting and swinging the cam member is inserted into the hollow of the gear shaft, and a locking pin member radially passing through an end portion of the control rod is slidably engaged with the cam guide groove of the gear shaft.

11. The multistage transmission according to claim 9, wherein the control rod is formed at two, axially right and left, positions with outer circumferential recessed sections and each is reduced in diameter and extends by a predetermined length.

12. A multistage transmission in which a plurality of drive gears and driven gears are rotatably supported by respective parallel gear shafts in a constant-mesh state for each speed-change stage, one of the plurality of drive gears and driven gears is secured to a gear shaft and engaging means provided between the other of the plurality of drive gears and driven gears and the gear shaft to establish engagement therebetween is switchably driven to execute shifting by shift drive means, the engaging means comprising:
an engaging portion circumferentially formed with engaging surfaces at a plurality of desired circumferential positions of an inner circumferential surface of each gear;
an engaging member provided in the gear shaft to disengageably engage with the engaging portion of each gear; and
a plurality of cam rods adapted to come into axially movably slidable contact with a hollow inner circumferential surface of the gear shaft, formed with a plurality of cam surfaces on a slidable contact surface at desired axial positions, and be moved to operate the engaging members;
wherein the shift drive means includes
a control rod provided inside the plurality of cam rods at the hollow central axis of the gear shaft; and
a lost motion mechanism interposed between the outer circumferential surface of the control rod and the inner surfaces of the cam rods to simultaneously move the control rod and the cam rods via axially acting springs.

13. The multistage transmission according to claim 12, wherein two of the lost motion mechanisms are axially provided on the control rod, and
the lost motion mechanisms simultaneously move the respective different cam rods.

14. The multistage transmission according to claim 12, wherein the lost motion mechanism includes:
a cylindrical spring holder interposed between the outer circumferential surface of the control rod and the inner surfaces of the cam rods at an axial position covering an outer recessed section formed by reducing the diameter of the control rod, integrally engaged with a desired cam rod, and formed with an inner circumferential recessed section corresponding to the outer circumferential recessed section and having the same axial length as that of the outer circumferential recessed section;
a pair of spring receivers, opposed to each other, spanned between both spaces of the inner circumferential recessed section of the spring holder corresponding to the outer circumferential recessed section of the control rod; and
the spring interposed between the pair of spring receivers so as to bias both the spring receivers in such a direction as to make the spring receivers away from each other.

15. The multistage transmission according to claim 13, wherein the lost motion mechanism includes:
a cylindrical spring holder interposed between the outer circumferential surface of the control rod and the inner surfaces of the cam rods at an axial position covering an outer recessed section formed by reducing the diameter of the control rod, integrally engaged with a desired cam rod, and formed with an inner circumferential recessed section corresponding to the outer circumferential recessed section and having the same axial length as that of the outer circumferential recessed section;
a pair of spring receivers, opposed to each other, spanned between both spaces of the inner circumferential recessed section of the spring holder corresponding to the outer circumferential recessed section of the control rod; and
wherein the spring is interposed between the pair of spring receivers so as to bias both the spring receivers in such a direction as to make the spring receivers away from each other.

* * * * *